United States Patent
Kamoto et al.

(10) Patent No.: US 7,165,389 B2
(45) Date of Patent: Jan. 23, 2007

(54) CATALYST DEGRADATION DETERMINING METHOD

(75) Inventors: Akira Kamoto, Susono (JP); Toshinari Nagai, Sunto-gun (JP); Yosuhiro Oi, Numazu (JP); Noriyasu Adachi, Susono (JP); Koji Ide, Toyota (JP); Daisuke Kobayashi, Susono (JP); Shuntaro Okazaki, Susono (JP); Naoto Kato, Susono (JP); Takahiro Uchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/133,208

(22) Filed: May 20, 2005

(65) Prior Publication Data
US 2005/0217243 A1    Oct. 6, 2005

Related U.S. Application Data

(62) Division of application No. 10/606,375, filed on Jun. 26, 2003, now Pat. No. 6,915,628.

(30) Foreign Application Priority Data
Jul. 10, 2002    (JP)    .............................. 2002-201544

(51) Int. Cl.
    F01N 3/00    (2006.01)
(52) U.S. Cl. ............................ 60/274; 60/276; 60/277; 60/285; 701/103; 701/107
(58) Field of Classification Search .................. 60/274, 60/276, 277, 285; 701/103, 107, 109, 114
See application file for complete search history.

(56) References Cited

U.S. PATENT DOCUMENTS

| 5,279,115 A | * | 1/1994 | Inoue et al. ................... 60/276 |
| 5,345,911 A | * | 9/1994 | Kadowaki et al. .......... 123/436 |
| 5,414,996 A |   | 5/1995 | Sawada et al. |
| 5,509,267 A |   | 4/1996 | Theis |
| 5,678,402 A | * | 10/1997 | Kitagawa et al. ............. 60/276 |
| 5,740,676 A |   | 4/1998 | Agustin et al. |
| 5,937,638 A | * | 8/1999 | Akazaki et al. ................ 60/274 |

(Continued)

FOREIGN PATENT DOCUMENTS

JP    A 5-209510    8/1993

(Continued)

Primary Examiner—Tu M. Nguyen
(74) Attorney, Agent, or Firm—Oliff & Berridge, PLC

(57) ABSTRACT

A catalyst degradation determining method includes the steps of: controlling an upstream-of-catalyst air-fuel ratio occurring upstream of a first catalyst to an air-fuel ratio that is rich of a stoichiometric air-fuel ratio so that first and second catalysts store oxygen up to a maximum storage amount of oxygen. The method then includes the steps of controlling the upstream-of-catalyst air-fuel ratio to a first lean air-fuel ratio until an output of a downstream-of-first-catalyst sensor indicates a lean air-fuel ratio, and then to a second lean air-fuel ratio and that has a value that is determined in accordance with an oxidizing-reducing capability index value, until a time point when an output of a downstream-of-second-catalyst air-fuel ratio sensor indicates an air-fuel ratio that is lean.

3 Claims, 17 Drawing Sheets

U.S. PATENT DOCUMENTS

| | | |
|---|---|---|
| 5,970,707 A | 10/1999 | Sawada et al. |
| 6,116,021 A * | 9/2000 | Schumacher et al. ......... 60/274 |
| 6,138,453 A | 10/2000 | Sawada et al. |
| 6,145,304 A | 11/2000 | Takahashi et al. |
| 6,185,929 B1 * | 2/2001 | Ishizuka et al. .............. 60/274 |
| 6,253,541 B1 | 7/2001 | Sullivan et al. |
| 6,256,981 B1 | 7/2001 | Sullivan et al. |
| 6,256,983 B1 | 7/2001 | Yasui |
| 6,336,320 B1 | 1/2002 | Tanaka et al. |
| 6,345,498 B1 * | 2/2002 | Yonekura et al. ............. 60/277 |
| 6,477,833 B1 * | 11/2002 | Tayama et al. ............... 60/285 |
| 6,494,038 B1 | 12/2002 | Kobayashi et al. |
| 6,519,932 B1 * | 2/2003 | Ohuchi et al. ................ 60/285 |
| 6,539,707 B1 | 4/2003 | Ikemoto et al. |
| 6,619,032 B1 | 9/2003 | Kakuyama et al. |
| 6,622,478 B1 | 9/2003 | Nakamura |
| 6,629,409 B1 | 10/2003 | Lewis et al. |
| 6,637,194 B1 | 10/2003 | Kakuyama et al. |
| 6,655,129 B1 * | 12/2003 | Lindner et al. ................ 60/277 |
| 6,672,053 B1 * | 1/2004 | Bidner et al. ................. 60/285 |
| 6,718,754 B1 * | 4/2004 | Kobayashi et al. ........... 60/277 |
| 6,739,122 B1 * | 5/2004 | Kitajima et al. .............. 60/277 |
| 6,751,947 B1 | 6/2004 | Lewis et al. |
| 6,751,950 B1 | 6/2004 | Ikemoto et al. |
| 6,850,165 B1 | 2/2005 | Sakanushi et al. |
| 6,915,628 B1 * | 7/2005 | Kamoto et al. ............... 60/277 |
| 6,976,356 B1 * | 12/2005 | Okada et al. ................. 60/286 |

FOREIGN PATENT DOCUMENTS

JP       2002-4930       1/2002

* cited by examiner

CATALYST DEGRADATION DETERMINING METHOD

RELATED APPLICATIONS

This is a Division of application Ser. No. 10/606,375 filed Jun. 26, 2003 U.S. Pat. No. 6,915,628. The entire disclosure of the prior application is hereby incorporated by reference herein in its entirety. The disclosure of Japanese Patent Application No. 2002-201544 filed on Jul. 10, 2002, including the specification, drawings and abstract is incorporated herein by reference in its entirety.

BACKGROUND OF THE INVENTION

1. Field of Invention

The invention relates to a catalyst degradation determining method for determining whether a catalyst disposed in an exhaust passage of an internal combustion engine has degraded.

2. Description of Related Art

A known three-way catalyst (in this specification, sometimes referred to simply as "catalyst") for controlling exhaust gas from an internal combustion engine is disposed in an exhaust passage of the internal combustion engine. The three-way catalyst performs the function of oxidizing unburned components (HC, CO) (oxidizing function), and the function of reducing nitrogen oxides (NOx) (reducing function), and is able to substantially remove harmful components, including unburned components and nitrogen oxides mentioned above, due to the oxidizing and reducing functions.

The efficiency of removal of harmful components by the oxidizing and reducing functions of the catalyst is known to rise as the air-fuel ratio of the internal combustion engine approaches a stoichiometric air-fuel ratio. If the air-fuel ratio of the internal combustion engine is kept within a predetermined range (hereinafter, referred to as "window range") that contains the stoichiometric air-fuel ratio, the removal efficiency can be kept at or above a predetermined high value.

The three-way catalyst further has the function of oxidizing unburned components, such as HC, CO, etc., with oxygen released from the catalyst if the exhaust gas coming into the three-way catalyst has a fuel rich-side air-fuel ratio (oxygen releasing function), and the function of storing oxygen released from nitrogen oxides (NOx) if the incoming exhaust gas has a fuel lean-side air-fuel ratio (oxygen storing function). Due to the oxygen releasing and storing functions, the three-way catalyst is able to substantially remove harmful components including unburned components and nitrogen oxides mentioned above. Therefore, the emissions control capability of the three-way catalyst increases with increases in the maximum value of the amount of oxygen storable in the three-way catalyst. Hereinafter, the amount of oxygen storable in the three-way catalyst will be referred to as "oxygen storage amount", and the maximum value thereof will be referred to as "maximum oxygen storage amount".

The catalyst degrades due to heat given to the catalyst or the poisoning by lead, sulfur and the like contained in fuel. As the degradation of the catalyst progresses, the maximum oxygen storage amount decreases. Therefore, if the maximum oxygen storage amount of the catalyst is estimated, it becomes possible to determine whether the catalyst has degraded on the basis of the estimated maximum oxygen storage amount. It is to be understood that "storage" used herein means retention of a substance (solid, liquid, gas molecules) in the form of at least one of adsorption, adhesion, absorption, trapping, occlusion, and others.

A catalyst degradation degree detecting apparatus disclosed in Japanese Patent Application Laid-Open Publication No. 5-133264 is provided on the basis of the aforementioned finding. That is, the air-fuel ratio of the internal combustion engine is forcibly changed from a fuel-lean air-fuel ratio to a predetermined fuel-rich air-fuel ratio (or from a fuel-rich air-fuel ratio to a predetermined fuel-lean air-fuel ratio). On the basis of a corresponding change in the output of the air-fuel ratio sensor disposed downstream of the catalyst, the maximum oxygen storage amount of the catalyst is estimated. A degree of degradation of the catalyst is detected on the basis of the estimated maximum oxygen storage amount.

More specifically, the disclosed apparatus first sets the oxygen storage amount at the maximum oxygen storage amount by controlling the upstream-of-catalyst air-fuel ratio to a lean-side air-fuel ratio, and then controls the air-fuel ratio of the catalyst to a predetermined rich-side air-fuel ratio. By multiplying the time elapsing until the oxygen storage amount of the catalyst reaches "0" and the output-of the air-fuel ratio sensor disposed downstream of the catalyst changes to a rich side (hereinafter, the time point of the output of the air-fuel ratio changing to the rich side will be referred to as "the time of air-fuel ratio sensor output rich-side switch") by the amount of oxygen released (consumed) in the catalyst per unit time, the apparatus estimates a maximum oxygen storage amount (hereinafter, this estimation method is referred to as "rich air-fuel ratio-based estimation method"). In another method, the upstream-of-catalyst air-fuel ratio is controlled to a rich air-fuel ratio so as to set the oxygen storage amount of the catalyst at "0". After that, the upstream-of-catalyst air-fuel ratio is controlled to a predetermined lean-side air-fuel ratio. By multiplying the time elapsing until the oxygen storage amount of the catalyst reaches or exceeds the maximum oxygen storage amount and the output of the air-fuel ratio sensor disposed downstream of the catalyst changes to the lean side (hereinafter, the time point of the output of the air-fuel ratio changing to the lean side will be referred to as "the time of air-fuel ratio sensor output lean-side switch") by the amount of oxygen inflow to the catalyst per unit time, a maximum oxygen storage amount is estimated (hereinafter, this estimation method is referred to as "lean air-fuel ratio-based estimation method"). That is, this apparatus determines a maximum oxygen storage amount by using at least a change in the output of the air-fuel ratio sensor disposed downstream of the catalyst, and the predetermined lean air-fuel ratio or the predetermined rich air-fuel ratio in, for example, a case where there is a need to estimate the maximum oxygen storage amount again, or the like.

If the maximum oxygen storage amount of the catalyst is estimated by the rich air-fuel ratio-based estimation method, supply of a mixture of the predetermined rich air-fuel ratio is continued until the aforementioned air-fuel ratio sensor output rich-side switch occurs. In this case, as the maximum oxygen storage amount of the catalyst is estimated at the time of the air-fuel ratio sensor output rich-side switch, it is no longer necessary to keep the upstream-of-catalyst air-fuel ratio at an air-fuel ratio that is rich of the stoichiometric air-fuel ratio. If the upstream-of-catalyst air-fuel ratio is kept rich of the stoichiometric air-fuel ratio immediately after the air-fuel ratio sensor output rich-side switch, unburned components, such as CO, HC and the like, are readily discharged since the oxygen storage amount of the catalyst is "0" and the oxygen releasing function of the catalyst is not effective. Therefore, after the air-fuel ratio sensor output rich-side switch occurs, it is preferable to set the upstream-of-catalyst air-fuel ratio at the stoichiometric air-fuel ratio or set the upstream-of-catalyst air-fuel ratio at an air-fuel ratio that is lean of the stoichiometric air-fuel ratio.

However, at the time of air-fuel ratio sensor output rich-side switch, a space defined by the catalyst and the exhaust passage from the exhaust port of the internal combustion engine to the air-fuel ratio sensor disposed downstream of the catalyst is filled with a gas having a predetermined rich air-fuel ratio. If in this case, the predetermined rich air-fuel ratio is considerably below a lower limit value of the aforementioned window range, unburned components contained in the gas filling the aforementioned exhaust passage and the like, that is, CO, HC, etc., are great in amount. Furthermore, since the oxygen releasing function of the catalyst is not effective and the efficiency of removal of unburned CO, HC by the oxidizing function of the catalyst is low, large amounts of unburned CO and HC are emitted into the atmosphere immediately after the air-fuel ratio sensor output rich-side switch occurs although the upstream-of-catalyst air-fuel ratio immediately following the air-fuel ratio sensor output rich-side switch is set at the stoichiometric air-fuel ratio or an air-fuel ratio lean of the stoichiometric air-fuel ratio.

Therefore, if the maximum oxygen storage amount of the catalyst is estimated by the rich air-fuel ratio-based estimation method, it is preferable to set the aforementioned rich air-fuel ratio at an air-fuel ratio that is rich of the stoichiometric air-fuel ratio and that is equal to or higher than the lower limit value of the window range in order to lessen the amount of unburned CO, HC emitted immediately after the air-fuel ratio sensor output rich-side switch occurs.

Similarly, if the maximum oxygen storage amount of the catalyst is estimated by the lean air-fuel ratio-based estimation method, the supply of a mixture having the aforementioned predetermined lean air-fuel ratio is continued until the air-fuel ratio sensor output lean-side switch occurs. In this case, as the maximum oxygen storage amount of the catalyst is estimated at the time of the air-fuel ratio sensor output lean-side switch, it is no longer necessary to keep the upstream-of-catalyst air-fuel ratio at an air-fuel ratio that is lean of the stoichiometric air-fuel ratio. If the upstream-of-catalyst air-fuel ratio is kept lean of the stoichiometric air-fuel ratio immediately after the air-fuel ratio sensor output lean-side switch occurs, nitrogen oxides NOx are likely to be emitted since the oxygen storage amount of the catalyst has reached the maximum oxygen storage amount and the oxygen storing function of the catalyst is not effective. Therefore, after the air-fuel ratio sensor output lean-side switch occurs, it is preferable to set the upstream-of-catalyst air-fuel ratio at the stoichiometric air-fuel ratio, or set the upstream-of-catalyst air-fuel ratio at an air-fuel ratio that is rich of the stoichiometric air-fuel ratio in, for example, a case where there is a need to estimate the maximum oxygen storage amount again, or the like.

However, at the time of air-fuel ratio sensor output lean-side switch, the space defined by the catalyst and the exhaust passage from the exhaust port of the internal combustion engine to the air-fuel ratio sensor disposed downstream of the catalyst is filled with a gas having a predetermined lean air-fuel ratio. If in this case, the predetermined lean air-fuel ratio is considerably above an upper limit value of the aforementioned window range, nitrogen oxides NOx contained in the filling gas are great in amount. Furthermore, since the oxygen storing function of the catalyst is not effective and the efficiency of removal of nitrogen oxides NOx by the reducing function of the catalyst is low, a large amount of nitrogen oxides NOx is emitted into the atmosphere immediately after the air-fuel ratio sensor output lean-side switch occurs although the upstream-of-catalyst air-fuel ratio immediately following the air-fuel ratio sensor output lean-side switch is set at the stoichiometric air-fuel ratio or an air-fuel ratio that is rich of the stoichiometric air-fuel ratio.

Therefore, if the maximum oxygen storage amount of the catalyst is estimated by the lean air-fuel ratio-based estimation method, it is preferable to set the aforementioned lean air-fuel ratio at an air-fuel ratio that is lean of the stoichiometric air-fuel ratio and that is equal to or lower than the higher limit value of the window range in order to lessen the amount of nitrogen oxides NOx emitted immediately after the air-fuel ratio sensor output lean-side switch occurs.

It is known that as the degradation of the catalyst progresses, the maximum oxygen storage amount decreases, and moreover, the efficiency of removal of harmful components by the oxidizing and reducing functions of the catalyst with respect to a fixed air-fuel ratio (oxidizing/reducing capability) decreases, and the window range of the catalyst narrows. It is also known that the efficiency of removal of harmful components by the oxidizing and reducing functions of the catalyst with respect to a fixed air-fuel ratio and the window range of the catalyst also change depending on the temperature of the catalyst.

Therefore, if the maximum oxygen storage amount of the catalyst is estimated by the rich air-fuel ratio-based estimation method or the lean air-fuel ratio-based estimation method while using the assumption that the window range is constant, and that the predetermined rich air-fuel ratio is a constant air-fuel ratio which is within the window range and near the lower limit value of the window range, or that the predetermined lean air-fuel ratio is a constant air-fuel ratio which is within the window range and near the upper limit value of the window range, the following problem may occur. That is, as the degradation of the catalyst progresses, the predetermined rich air-fuel ratio or the predetermined lean air-fuel ratio becomes an air-fuel ratio that is outside the window range, and it becomes impossible to lessen the amount of harmful components emitted immediately after the switch of the output of the downstream-of-catalyst air-fuel ratio sensor occurs.

The amount of harmful components emitted immediately after the switch of the output of the downstream-of-catalyst air-fuel ratio sensor occurs can be lessened if the predetermined rich air-fuel ratio or the predetermined lean air-fuel ratio is set beforehand at an air-fuel ratio that is near the stoichiometric air-fuel ratio. However, this measure creates a problem of a prolonged time elapsing from the beginning of control of the upstream-of-catalyst air-fuel ratio to the predetermined rich air-fuel ratio or lean air-fuel ratio to the switch of the output of the downstream-of-catalyst air-fuel ratio sensor (i.e., a prolonged period results for calculation of the maximum oxygen storage amount of the catalyst).

SUMMARY OF THE INVENTION

Accordingly, a catalyst degradation determining method capable of minimizing the emission of harmful components, and estimating a maximum oxygen storage amount of a catalyst within a relatively short period of time, and determining whether the catalyst has degraded on the basis of the maximum oxygen storage amount is provided as an embodiment of the invention.

In order to achieve the aforementioned object, a catalyst degradation determining method in accordance with a first aspect of the invention applied to an emission control apparatus of an internal combustion engine that includes a catalyst disposed in an exhaust passage of the internal combustion engine, and a downstream-of-catalyst air-fuel ratio sensor disposed in the exhaust passage downstream of the catalyst is constructed as follows. First, an oxidizing-reducing capability index value that changes in accordance with a degree of an oxidizing-reducing capability of the catalyst is acquired, and an upstream-of-catalyst air-fuel ratio occurring upstream of the catalyst is controlled to an air-fuel ratio that is lean of a stoichiometric air-fuel ratio so that the catalyst stores oxygen in the catalyst up to a maximum storage amount of oxygen.

Then, the upstream-of-catalyst air-fuel ratio is controlled to a rich air-fuel ratio that is rich of the stoichiometric air-fuel ratio and that has a value that is determined in accordance with the oxidizing-reducing capability index value, until a time point when an output of the downstream-of-catalyst air-fuel ratio sensor indicates an air-fuel ratio that is rich of the stoichiometric air-fuel ratio. A maximum oxygen storage amount of the catalyst is estimated by taking into account the value of the rich air-fuel ratio to which the upstream-of-catalyst air-fuel ratio was controlled. That is, the maximum oxygen storage amount of the catalyst is estimated on the basis of the amount of oxygen released (consumed) due to gas of the rich air-fuel ratio.

Then, it is determined whether the catalyst has degraded based on the estimated maximum oxygen storage amount of the catalyst. The aforementioned "oxidizing-reducing capability index value" is preferably a degradation index value that changes in accordance with the degree of catalyst degradation or a value that changes in accordance with the catalyst temperature. It is also preferable that the oxidizing-reducing capability index value be a value based on the maximum oxygen storage amount of the catalyst estimated by the above-described method. However, these examples are not restrictive. For example, the oxidizing-reducing capability index value may be a ratio between the length of a locus of the output of an air-fuel ratio sensor disposed upstream of the catalyst and the length of a locus of the output of the air-fuel ratio sensor disposed downstream of the catalyst (locus ratio).

Therefore, the value of the aforementioned rich air-fuel ratio can be changed in accordance with the degree of the oxidizing-reducing capability of the catalyst (e.g., the degree of degradation of the catalyst) indicated by the oxidizing-reducing capability index value. Furthermore, as mentioned above, the window range of the catalyst narrows as degradation of the catalyst progresses. Therefore, for example, the aforementioned rich air-fuel ratio can be kept at an air-fuel ratio that is within the window range of the catalyst and that is near the lower limit value of the window range, regardless of the degree of degradation of the catalyst.

As a result, the efficiency of removal of unburned components, such as CO, HC, etc., based on the oxidizing function of the catalyst immediately after the time point at which the output of the downstream-of-catalyst air-fuel ratio sensor indicates an air-fuel ratio that is rich of the stoichiometric air-fuel ratio is kept at or above a predetermined high efficiency value, and therefore the amount of CO and HC emitted immediately after the aforementioned time point can be minimized. Furthermore, since the aforementioned rich air-fuel ratio is set at an air-fuel ratio that is as remote from the stoichiometric air-fuel ratio as possible, the period for calculating the maximum oxygen storage amount of the catalyst can be reduced, in comparison with a case where the rich air-fuel ratio is pre-set at a rich air-fuel ratio that is near the stoichiometric air-fuel ratio.

In order to control exhaust gas immediately following a startup of an internal combustion engine and further improve the emissions control capability following a complete engine warm-up, a construction is sometimes adopted in which a first catalyst having a relatively small capacity, generally termed start converter, is disposed in an exhaust passage of the internal combustion engine, and a second catalyst having a relatively large capacity, generally termed under-floor converter, is disposed in the exhaust passage downstream of the first catalyst. Since the first catalyst is disposed at a position closer to an exhaust port of the engine than the position of the second catalyst in this construction, the first catalyst receives relatively high temperature exhaust gas. Therefore, the first catalyst is warmed up and exhibits good emissions control performance within a short period of time following the startup of the engine The second catalyst, on the other hand, requires a longer time before being warmed up than the first catalyst. However, after being warmed up, the second catalyst exhibits excellent emissions control performance due to its large capacity.

In accordance with an embodiment of another aspect of the invention, there is provided a catalyst degradation determining method as described below. In a catalyst degradation determining method applied to an emission control apparatus of an internal combustion engine that includes: a first catalyst disposed in an exhaust passage of the internal combustion engine; a downstream-of-first catalyst air-fuel ratio sensor disposed in the exhaust passage downstream of the first catalyst; a second catalyst disposed in the exhaust passage downstream of the downstream-of-first catalyst air-fuel ratio sensor; and a downstream-of-second catalyst air-fuel ratio sensor disposed in the exhaust passage downstream of the second catalyst, an oxidizing-reducing capability index value that changes in accordance with at least one of a degree of an oxidizing-reducing capability of the first catalyst and a degree of an oxidizing-reducing capability of the second catalyst is acquired. Furthermore, an upstream-of-first catalyst air-fuel ratio occurring upstream of the first catalyst is controlled to an air-fuel ratio that is lean of a stoichiometric air-fuel ratio so that the first catalyst stores oxygen in the first catalyst up to a maximum oxygen storage amount of the first catalyst and the second catalyst stores oxygen in the second catalyst up to a limit of possible oxygen storage of the second catalyst.

Then, the upstream-of-first catalyst air-fuel ratio is controlled to a first rich air-fuel ratio that is rich of the stoichiometric air-fuel ratio, until a time point when an output of the downstream-of-first catalyst air-fuel ratio sensor indicates an air-fuel ratio rich of the stoichiometric air-fuel ratio. After that, the upstream-of-first catalyst air-fuel ratio is controlled to a second rich air-fuel ratio that is rich of the stoichiometric air-fuel ratio and that has a value that is determined in accordance with the oxidizing-reducing capability index value, until a time point when an output of the downstream-of-second catalyst air-fuel ratio sensor indicates an air-fuel ratio that is rich of the stoichiometric air-fuel ratio.

A maximum oxygen storage amount of the first catalyst is estimated by taking into account the first rich air-fuel ratio to which the upstream-of-first catalyst air-fuel ratio was controlled. That is, the maximum oxygen storage amount of the first catalyst is estimated on the basis of the amount of oxygen released (consumed) due to gas of the first rich air-fuel ratio. Furthermore, a maximum oxygen storage amount of the second catalyst is estimated by taking into account the value of the second rich air-fuel ratio to which the upstream-of-first catalyst air-fuel ratio was controlled. That is, the maximum oxygen storage amount of the second catalyst is estimated on the basis of the amount of oxygen released (consumed) due to gas of the second rich air-fuel ratio.

It is determined whether at least one of the first catalyst, the second catalyst and a catalyst device that includes the first catalyst and the second catalyst has degraded based on at least one of the estimated maximum oxygen storage of the first catalyst and the estimated maximum oxygen storage of the second catalyst.

In this catalyst degradation determining method, it is preferable to adopt a construction in which an arbitrary one or at least one of the following determining operations is performed: determination as to whether the first catalyst has degraded on the basis of the estimated maximum oxygen storage amount of the first catalyst; determination as to whether the second catalyst has degraded on the basis of the estimated maximum oxygen storage amount of the second catalyst; determination as to whether the first catalyst has degraded on the basis of the estimated maximum oxygen storage amount of the first catalyst, as well as determination as to whether the second catalyst has degraded on the basis of the estimated maximum oxygen storage amount of the second catalyst; and determination as to whether the catalyst device that includes the first catalyst and the second catalyst has degraded on the basis of the estimated maximum oxygen storage amount of the first catalyst and the estimated maximum oxygen storage amount of the second catalyst.

Therefore, the time point at which the oxygen stored in the first catalyst is completely consumed can be reliably detected on the basis of a change in the output of the downstream-of-first catalyst air-fuel ratio sensor, so that the maximum oxygen storage amount of the first catalyst can be estimated with good precision. Furthermore, the time point at which the oxygen stored in the second catalyst is completely consumed can be reliably detected on the basis of a change in the output of the downstream-of-second catalyst air-fuel ratio sensor, so that the maximum oxygen storage amount of the second catalyst can be estimated with good precision.

Furthermore, the second rich air-fuel ratio can be changed in accordance with the degree of the oxidizing-reducing capability of the first catalyst and/or the degree of the oxidizing-reducing capability of the second catalyst (e.g., the degree of degradation of the first catalyst and/or the degree of degradation of the second catalyst) indicated by the oxidizing-reducing capability index value. Also, as mentioned above, the window range of each of the first and second catalysts narrows with progression of degradation of the corresponding one of the catalysts. Therefore, for example, the second rich air-fuel ratio can be kept at an air-fuel ratio that is within the window range of the catalyst device formed by the first and second catalysts and that is near the lower limit value of the window range, regardless of the degrees of degradation of the first and second catalysts.

As a result, the efficiency of removal of unburned components, such as CO, HC, etc., based on the oxidizing function of the catalyst device immediately after the time point at which the output of the downstream-of-second catalyst air-fuel ratio sensor indicates an air-fuel ratio that is rich of the stoichiometric air-fuel ratio is kept at or above a predetermined high efficiency value, and therefore the amount of CO and HC emitted immediately after the aforementioned time point can be minimized. Furthermore, since the aforementioned second rich air-fuel ratio is set at an air-fuel ratio that is as remote from the stoichiometric air-fuel ratio as possible, the period for calculating the maximum oxygen storage amount of the second catalyst (i.e., the maximum oxygen storage amount calculation period for the first and second catalysts) can be reduced, in comparison with a case where the second rich air-fuel ratio is pre-set at a rich air-fuel ratio that is near the stoichiometric air-fuel ratio.

In accordance with an embodiment of still another aspect of the invention, there is provided a catalyst degradation determining method as described below. In a catalyst degradation determining method applied to an emission control apparatus of an internal combustion engine that includes: a catalyst disposed in an exhaust passage of the internal combustion engine; and a downstream-of-catalyst air-fuel ratio sensor disposed in the exhaust passage downstream of the catalyst, an oxidizing-reducing capability index value that changes in accordance with a degree of an oxidizing-reducing capability of the catalyst is acquired. Furthermore, an upstream-of-catalyst air-fuel ratio occurring upstream of the catalyst is controlled to an air-fuel ratio that is rich of a stoichiometric air-fuel ratio so that the catalyst completely releases oxygen stored in the catalyst.

Then, the upstream-of-catalyst air-fuel ratio is controlled to a lean air-fuel ratio that is lean of the stoichiometric air-fuel ratio and that has a value that is determined in accordance with the oxidizing-reducing capability index value, until a time point when an output of the downstream-of-catalyst air-fuel ratio sensor indicates an air-fuel ratio that is lean of the stoichiometric air-fuel ratio. A maximum oxygen storage amount of the catalyst is estimated by taking into account the value of the lean air-fuel ratio to which the upstream-of-catalyst air-fuel ratio was controlled. That is, the maximum oxygen storage amount of the catalyst is estimated on the basis of the amount of oxygen present in the gas of the aforementioned lean air-fuel ratio.

It is determined whether the catalyst has degraded based on the estimated maximum oxygen storage amount of the catalyst. The aforementioned "oxidizing-reducing capability index value" is preferably a degradation index value that changes in accordance with the degree of catalyst degradation or a value that changes in accordance with the catalyst temperature. It is also preferable that the oxidizing-reducing capability index value be a value based on the maximum oxygen storage amount of the catalyst already estimated by the above-described method. However, these examples are not restrictive. For example, the oxidizing-reducing capability index value may be a ratio between the length of a locus of the output of an air-fuel ratio sensor disposed upstream of the catalyst and the length of a locus of the output of an air-fuel ratio sensor disposed downstream of the catalyst (locus ratio).

Therefore, the value of the aforementioned lean air-fuel ratio can be changed in accordance with the degree of the oxidizing-reducing capability of the catalyst (e.g., the degree of degradation of the catalyst) indicated by the oxidizing-reducing capability index value. Furthermore, as mentioned above, the window range of the catalyst narrows as degradation of the catalyst progresses. Therefore, for example, the aforementioned lean air-fuel ratio can be kept at an air-fuel ratio that is within the window range of the catalyst and that is near the upper limit value of the window range, regardless of the degree of degradation of the catalyst.

As a result, the efficiency of removal of nitrogen oxides NOx based on the reducing function of the catalyst immediately after the time point at which the output of the downstream-of-catalyst air-fuel ratio sensor indicates an air-fuel ratio that is lean of the stoichiometric air-fuel ratio is kept at or above a predetermined high efficiency value, and therefore the amount of nitrogen oxides NOx emitted immediately after the aforementioned time point can be minimized. Furthermore, since the aforementioned lean air-fuel ratio is set at an air-fuel ratio that is as remote from the stoichiometric air-fuel ratio as possible, the period for calculating the maximum oxygen storage amount of the catalyst can be reduced, in comparison with a case where the lean air-fuel ratio is pre-set at a lean air-fuel ratio that is near the stoichiometric air-fuel ratio.

If a first catalyst and a second catalyst are disposed in series in an exhaust passage of an internal combustion engine, there is provided a catalyst degradation determining method in accordance with a fourth aspect of the invention. That is, in a catalyst degradation determining method applied to an emission control apparatus of an internal combustion engine that includes: a first catalyst disposed in an exhaust passage of the internal combustion engine; a downstream-of-first catalyst air-fuel ratio sensor disposed in the exhaust passage downstream of the first catalyst; a second catalyst disposed in the exhaust passage downstream of the downstream-of-first catalyst air-fuel ratio sensor; and a downstream-of-second catalyst air-fuel ratio sensor disposed in the exhaust passage downstream of the second catalyst, an oxidizing-reducing capability index value that changes in accordance with at least one of a degree of an oxidizing-reducing capability of the first catalyst and a degree of an oxidizing-reducing capability of the second catalyst is acquired. Furthermore, an upstream-of-first catalyst air-fuel ratio occurring upstream of the first catalyst is controlled to an air-fuel ratio that is rich of a stoichiometric air-fuel ratio so that the first catalyst completely releases oxygen stored in the first catalyst and the second catalyst completely releases oxygen stored in the second catalyst.

Then, the upstream-of-first catalyst air-fuel ratio is controlled to a first lean air-fuel ratio that is lean of the stoichiometric air-fuel ratio, until a time point when an output of the downstream-of-first catalyst air-fuel ratio sensor indicates an air-fuel ratio that is lean of the stoichiometric air-fuel ratio. After that, the upstream-of-first catalyst air-fuel ratio is controlled to a second lean air-fuel ratio that is lean of the stoichiometric air-fuel ratio and that has a value that is determined in accordance with the oxidizing-reducing capability index value, until a time point when an output of the downstream-of-second catalyst air-fuel ratio sensor indicates an air-fuel ratio that is lean of the stoichiometric air-fuel ratio.

A maximum oxygen storage amount of the first catalyst is estimated by taking into account the first lean air-fuel ratio to which the upstream-of-first catalyst air-fuel ratio was controlled. That is, the maximum oxygen storage amount of the first catalyst is estimated on the basis of the amount of oxygen present in the gas of the first lean air-fuel ratio. A maximum oxygen storage amount of the second catalyst is estimated by taking into account the value of the second lean air-fuel ratio to which the upstream-of-first catalyst air-fuel ratio was controlled. That is, the maximum oxygen storage amount of the second catalyst is estimated on the basis of the amount of oxygen present in the gas of the second lean air-fuel ratio.

It is determined whether at least one of the first catalyst, the second catalyst and a catalyst device that includes the first catalyst and the second catalyst has degraded based on at least one of the estimated maximum oxygen storage of the first catalyst and the estimated maximum oxygen storage of the second catalyst.

In this catalyst degradation determining method, it is preferable to adopt a construction in which an arbitrary one or at least one of the following determining operations is performed: determination as to whether the first catalyst has degraded on the basis of the estimated maximum oxygen storage amount of the first catalyst; determination as to whether the second catalyst has degraded on the basis of the estimated maximum oxygen storage amount of the second catalyst; determination as to whether the first catalyst has degraded on the basis of the estimated maximum oxygen storage amount of the first catalyst, as well as determination as to whether the second catalyst has degraded on the basis of the estimated maximum oxygen storage amount of the second catalyst; and determination as to whether the catalyst device that includes the first catalyst and the second catalyst has degraded on the basis of the estimated maximum oxygen storage amount of the first catalyst and the estimated maximum oxygen storage amount of the second catalyst.

The aforementioned "oxidizing-reducing capability index value" is preferably a degradation index value that changes in accordance with the degree of degradation of the first catalyst and/or the degree of degradation of the second catalyst or a value that changes in accordance with the temperature of the first catalyst and/or the temperature of the second catalyst. It is also preferable that the oxidizing-reducing capability index value be a value based on the maximum oxygen storage amount of the first catalyst already estimated by the above-described method and/or the maximum oxygen storage amount of the second catalyst already estimated by the above-described method (e.g., a value obtained by summing the maximum oxygen storage amount of the first catalyst and the maximum oxygen storage amount of the second catalyst already estimated by the above-described method). However, these examples are not restrictive. The first lean air-fuel ratio may be, for example, an air-fuel ratio equal to the second lean air-fuel ratio.

Therefore, the time point at which the oxygen stored in the first catalyst reaches the maximum oxygen storage amount can be reliably detected on the basis of a change in the output of the downstream-of-first catalyst air-fuel ratio sensor, so that the maximum oxygen storage amount of the first catalyst can be estimated with good precision. Furthermore, the time point at which the oxygen stored in the second catalyst reaches the maximum oxygen storage amount can be reliably detected on the basis of a change in the output of the downstream-of-second catalyst air-fuel ratio sensor, so that the maximum oxygen storage amount of the second catalyst can be estimated with good precision.

Furthermore, similarly to the catalyst degradation determining method in accordance with the third aspect of the invention, the second lean air-fuel ratio can be changed in accordance with the degree of the oxidizing-reducing capability of the first catalyst and/or the degree of the oxidizing-reducing capability of the second catalyst (e.g., the degree of degradation of the first catalyst and/or the degree of degradation of the second catalyst) indicated by the oxidizing-reducing capability index value. Also, as mentioned above, the window range of each of the first and second catalysts narrows with progression of degradation of the corresponding one of the catalysts. Therefore, for example, the second lean air-fuel ratio can be kept at an air-fuel ratio that is within the window range of the catalyst device formed by the first and second catalysts and that is near the upper limit value of the window range, regardless of the degrees of degradation of the first and second catalysts.

As a result, the efficiency of removal of nitrogen oxides NOx based on the reducing function of the catalyst device immediately after the time point at which the output of the downstream-of-second catalyst air-fuel ratio sensor indicates an air-fuel ratio that is lean of the stoichiometric air-fuel ratio is kept at or above a predetermined high efficiency value, and therefore the amount of nitrogen oxides NOx emitted immediately after the aforementioned time point can be minimized. Furthermore, since the aforementioned second lean air-fuel ratio is set at an air-fuel ratio that is as remote from the stoichiometric air-fuel ratio as possible, the period for calculating the maximum oxygen storage amount of the second catalyst (i.e., the maximum oxygen storage amount calculation period for the first and second catalysts) can be reduced, in comparison with a case where the second lean air-fuel ratio is pre-set at a lean air-fuel ratio that is near the stoichiometric air-fuel ratio.

In the above-described catalyst degradation determining methods, if the emission control apparatus of the internal combustion engine to which the catalyst degradation determining method is applied includes an upstream-of-catalyst air-fuel ratio sensor disposed in the exhaust passage upstream of the catalyst or upstream of the first catalyst, and an upstream-of-catalyst air-fuel ratio sensor abnormality detector for detecting an abnormality of the upstream-of-catalyst air-fuel ratio sensor, it is preferable to adopt a construction in which the maximum oxygen storage amount of the catalyst or the maximum oxygen storage amounts of the first catalyst and the second catalyst are estimated based on an output of the upstream-of-catalyst air-fuel ratio sensor, and in which a determination that the catalyst has degraded is prohibited in a case where the catalyst is in a state in which it is to be determined that the catalyst has degraded based on the estimated maximum oxygen storage amount, and where an abnormality of the upstream-of-catalyst air-fuel ratio sensor has been detected, and in which it is determined that the catalyst has not degraded regardless of whether an abnormality of the upstream-of-catalyst air-fuel ratio sensor has been detected, in a case where the catalyst is in a state in which it is to be determined that the catalyst has not degraded based on the estimated maximum oxygen storage amount.

In the case where the maximum oxygen storage amount of the catalyst or the maximum oxygen storage amounts of the first catalyst and the second catalyst are estimated on the basis of the output of the upstream-of-catalyst air-fuel ratio sensor, that is, in the case where the maximum oxygen storage amount of the catalyst or the maximum oxygen storage amounts of the first catalyst and the second catalyst are estimated by calculating the amount of oxygen released due to gas of a rich air-fuel ratio or the amount of oxygen present in gas of a lean air-fuel ratio on the basis of the amount of deviation of the present value of output of the upstream-of-catalyst air-fuel ratio sensor from the value of output of the upstream-of-catalyst air-fuel ratio sensor that occurs when the air-fuel ratio of the gas detected by the upstream-of-catalyst air-fuel ratio sensor is the stoichiometric air-fuel ratio (hereinafter, referred to as "stoichiometric air-fuel ratio-time output value"), it becomes impossible to acquire an accurate maximum oxygen storage amount if the upstream-of-catalyst air-fuel ratio sensor has an abnormality. Therefore, if an abnormality of the upstream-of-catalyst air-fuel ratio sensor is detected by the upstream-of-catalyst air-fuel ratio sensor abnormality detector, determination regarding catalyst degradation based on the estimated maximum oxygen storage amount as described above may possibly fail to provide a precise result of determination regarding catalyst degradation.

However, in general, as degradation of an air-fuel ratio sensor (a generally-termed concentration cell type oxygen sensor or a generally-termed limiting current type oxygen sensor) progresses, the amount of change in the output of the air-fuel ratio sensor with respect to an actual amount of change in the air-fuel ratio of gas subjected to detection by the air-fuel ratio sensor tends to decrease. That is, the amount of deviation of the value of output of the air-fuel ratio sensor from the stoichiometric air-fuel ratio-time output value with respect to the amount of deviation of the actual air-fuel ratio of gas subjected to detection by the air-fuel ratio sensor from the stoichiometric air-fuel ratio tends to decrease as degradation of the sensor progresses. In other words, as degradation of the upstream-of-catalyst air-fuel ratio sensor progresses (if the upstream-of-catalyst air-fuel ratio sensor has an abnormality), the maximum oxygen storage amount of the catalyst estimated on the basis of the output of the upstream-of-catalyst air-fuel ratio sensor becomes less than the actual maximum oxygen storage amount of the catalyst.

Therefore, in the case where it is determined whether a catalyst has degraded on the basis of whether the value indicating the maximum oxygen storage amount of the catalyst is less than or equal to a predetermined degradation criterion value, if the value indicating the maximum oxygen storage amount of the catalyst estimated on the basis of the output of the upstream-of-catalyst air-fuel ratio sensor is greater than the degradation criterion value while an abnormality of the upstream-of-catalyst air-fuel ratio sensor has been detected, it is certain that the value indicating the actual maximum oxygen storage amount of the catalyst is sufficiently greater than the degradation criterion value, and therefore a determination that the catalyst has not degraded can be correctly and precisely made despite the sensor abnormality. However, if the value indicating the maximum oxygen storage amount of the catalyst estimated on the basis of the output of the upstream-of-catalyst air-fuel ratio sensor is less than or equal to the degradation criterion value while an abnormality of the upstream-of-catalyst air-fuel ratio sensor has been detected, the magnitude relationship between the value indicating the actual maximum oxygen storage amount of the catalyst and the degradation criterion value is uncertain, and therefore a precise result of determination regarding degradation of the catalyst cannot be obtained.

According to the above-described construction, even if an abnormality of the upstream-of-catalyst air-fuel ratio sensor has been detected as a result of progression of degradation of the upstream-of-catalyst air-fuel ratio sensor, a determination that the catalyst has not degraded can be made. As long as a determination that the catalyst has not degraded is made, there is no need to replace the upstream-of-catalyst air-fuel ratio sensor. Thus, the time to replace the upstream-of-catalyst air-fuel ratio sensor can be delayed. Furthermore, since a determination that the catalyst has degraded is avoided if an abnormality of the upstream-of-catalyst air-fuel ratio sensor has been detected, a false determination regarding degradation of the catalyst can be prevented.

BRIEF DESCRIPTION OF THE DRAWINGS

The above mentioned and other objects, features, advantages, technical and industrial significance of this invention will be better understood by reading the following detailed description of preferred exemplary embodiments of the invention, when considered in connection with the accompanying drawings, in which.

DETAILED DESCRIPTION OF PREFERRED EMBODIMENTS

In the following description and the accompanying drawings, the present invention will be described in more detail with reference to exemplary embodiments.

Figure 1:
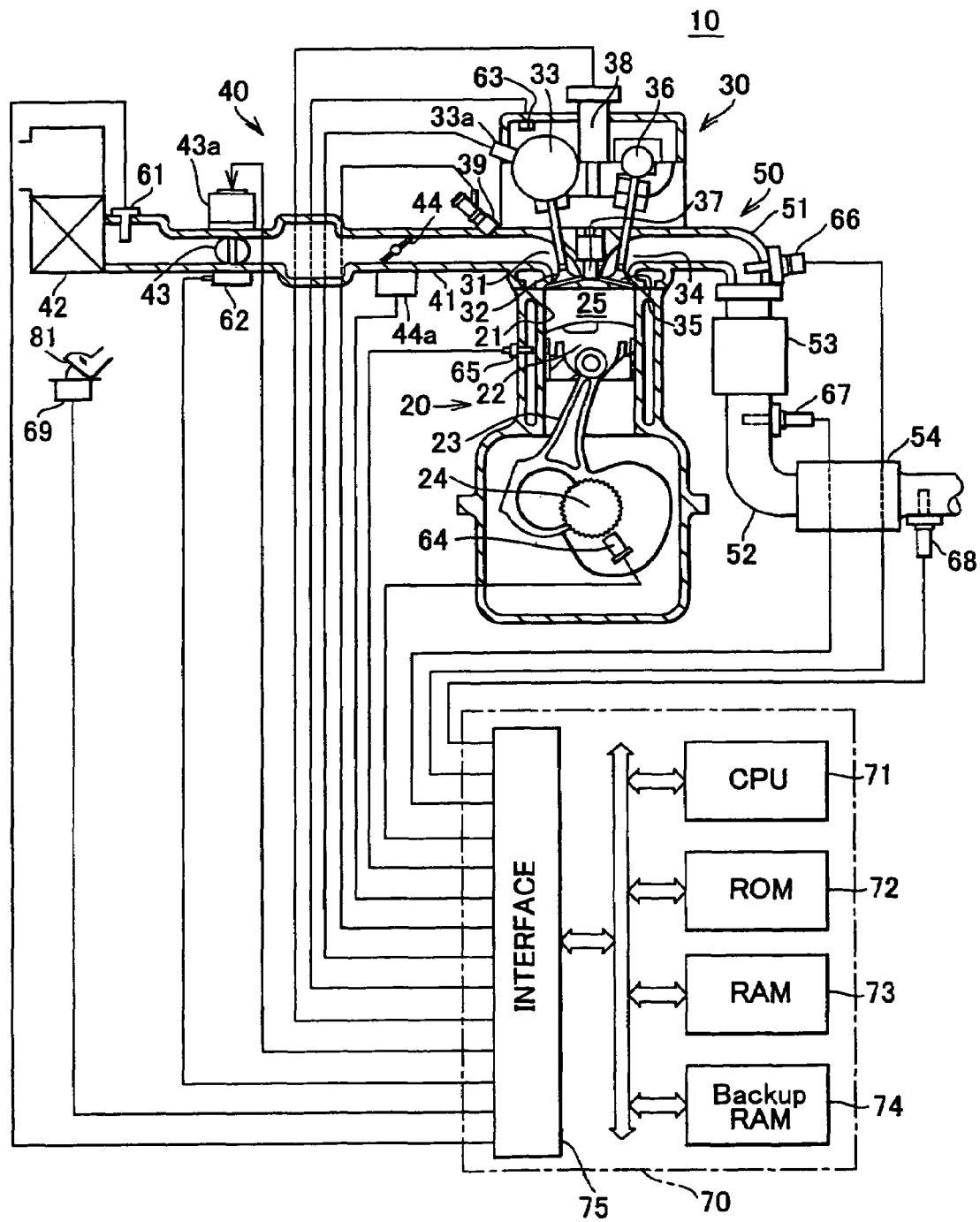
FIG. 1 is a schematic illustration of an internal combustion engine equipped with an emission control apparatus (catalyst degradation determining apparatus) for carrying out a catalyst degradation determining method in accordance with an embodiment of the invention.

FIG. 1 is a schematic illustration of the construction of a system in which an emission control apparatus (catalyst degradation determining apparatus) for carrying out a catalyst degradation determining method in accordance with an embodiment of the invention is applied to a spark ignition type multi-cylinder (e.g., four-cylinder) internal combustion engine 10.

The internal combustion engine 10 includes a cylinder block section 20 that includes a cylinder block lower case, an oil pan, etc., a cylinder head section 30 fixed to the cylinder block section 20, an intake system 40 for supplying gasoline mixture to the cylinder block section 20, and an exhaust system 50 for releasing exhaust gas from the cylinder block section 20 to the outside.

The cylinder block section 20 includes cylinders 21, pistons 22, connecting rods 23, and a crankshaft 24. The pistons 22 reciprocate within the cylinders 21. The reciprocating movements of the pistons 22 are transferred to the crankshaft 24 via the connecting rods 23, thereby rotating the crankshaft 24. The cylinders 21, heads of the pistons 22 and the cylinder head section 30 define combustion chambers 25.

The cylinder head section 30 includes intake ports 31 connected in communication to the combustion chambers 25, intake valves 32 that open and close the intake ports 31, a variable intake timing device 33 that includes an intake camshaft for driving the intake valves 32, and that continuously changes the phase angle of the intake camshaft, and an actuator 33a of the variable intake timing device 33. The cylinder head section 30 also includes exhaust ports 34 connected in communication to the combustion chambers 25, exhaust valves 35 that open and close the exhaust ports 34, an exhaust camshaft 36 for driving the exhaust valves 35, ignition plugs 37, an igniter 38 that includes an ignition coil for producing a high voltage to be supplied to the ignition plugs 37, and injectors (fuel injection means) 39 that inject fuel into the intake ports 31.

The intake system 40 includes an intake pipe 41 that is connected in communication to the intake ports 31 and that includes an intake manifold that forms an intake passage together with the intake ports 31, an air filter 42 provided at an end portion of the intake pipe 41, a throttle valve 43 provided within the intake pipe 41 for varying the sectional area of the opening of the intake passage, a throttle valve actuator 43a formed by a DC motor which forms throttle valve drive means, a swirl control valve (hereinafter, referred to as "SCV") 44, and an SCV actuator 44a formed by a DC motor.

The exhaust system 50 includes an exhaust manifold 51 connected in communication to the exhaust ports 34, an exhaust pipe 52 connected in communication to the exhaust manifold 51, an upstream-side first catalyst (also referred to as "upstream-side three-way catalyst" or "start converter") 53 disposed in the exhaust pipe 52 (between exhaust pipe portions), a second catalyst (also referred to as "downstream-side three-way catalyst" or as "under-floor converter" due to the mounting below a floor of a vehicle) 54 disposed in the exhaust pipe 52 (between exhaust pipe portions) downstream of the first catalyst 53. The exhaust ports 34, the exhaust manifold 51 and the exhaust pipe 52 form an exhaust passage.

This system includes a hot wire air flow meter 61, a throttle position sensor 62, a cam position sensor 63, a crank position sensor 64, a water temperature sensor 65, an air-fuel ratio sensor 66 disposed in the exhaust passage upstream of the first catalyst 53 (hereinafter, referred to as "upstream-most air-fuel ratio sensor 66"), an air-fuel ratio sensor 67 disposed in the exhaust passage downstream of the first catalyst 53 and upstream of the second catalyst 54 (hereinafter, referred to as "downstream-of-first catalyst air-fuel ratio sensor 67"), an air-fuel ratio sensor 68 disposed downstream of the second catalyst 54 (hereinafter, referred to as "downstream-of-second catalyst air-fuel ratio sensor 68"), and an accelerator operation amount sensor 69.

Figure 2:
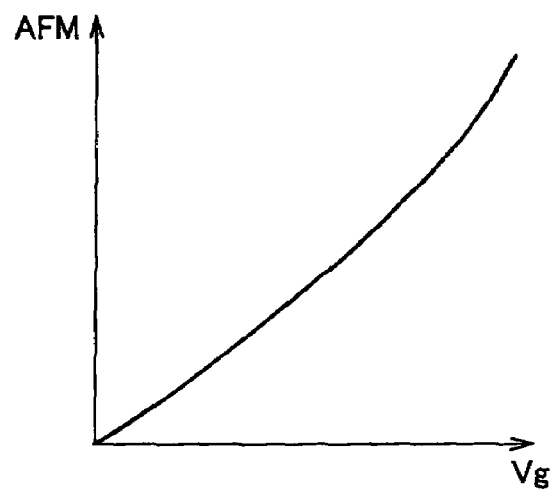
FIG. 2 is a map indicating a relationship between the output voltage of an air flow meter shown in FIG. 1 and the measured amount of intake air.

The hot wire air flow meter 61 is designed to output a voltage Vg corresponding to the mass flow of intake air that flows in the intake pipe 41. A relationship between the output Vg of the air flow meter 61 and the measured intake air amount (flow) AFM is indicated in FIG. 2. The throttle position sensor 62 is designed to detect the degree of opening of the throttle valve 43 and output a signal that indicates the degree of throttle valve opening TA. The cam position sensor 63 is designed to generate a signal (G2 signal) having a pulse at every rotational angle of 90° of the intake camshaft (that is, every rotational angle of 180° of the crankshaft 24). The crank position sensor 64 is designed to output a signal that has a narrow pulse at every 10° rotation of the crankshaft 24 and has a wide pulse at every 360° rotation of the crankshaft 24. This signal indicates the engine rotation speed NE. The water temperature sensor 65 is designed to detect the temperature of cooling water of the internal combustion engine 10 and output a signal indicating the cooling water temperature THW.

Figure 3:
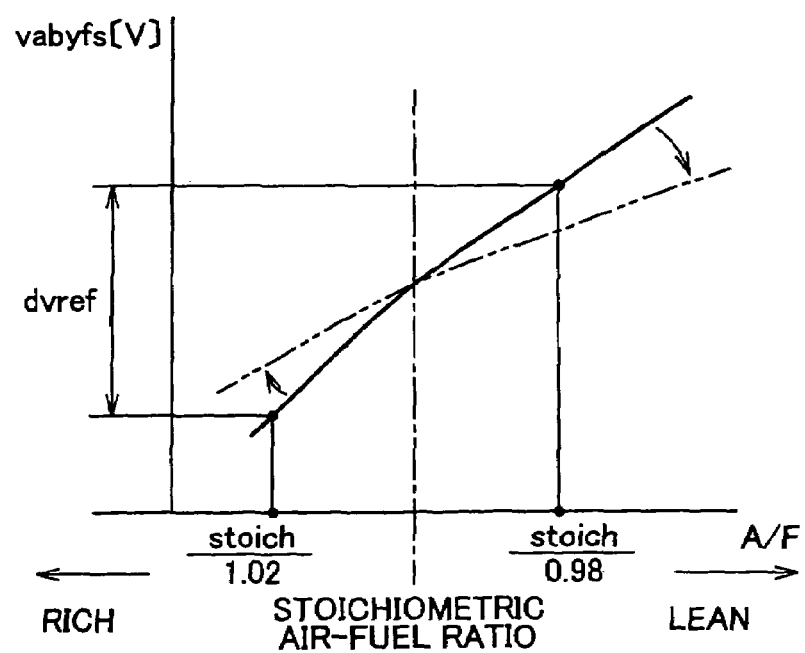
FIG. 3 is a map indicating a relationship between the output voltage of an upstream-most air-fuel ratio sensor shown in FIG. 1 and the air-fuel ratio.

The upstream-most air-fuel ratio sensor 66 is a generally-termed limiting current type oxygen sensor, and is designed to output an electric current corresponding to the air-fuel ratio A/F, and output a voltage vabyfs corresponding to the current as indicated by a solid line in FIG. 3. As is apparent from FIG. 3, the upstream-most air-fuel ratio sensor 66 allows high-precision detection of the air-fuel ratio A/F over a wide range.

Figure 4:
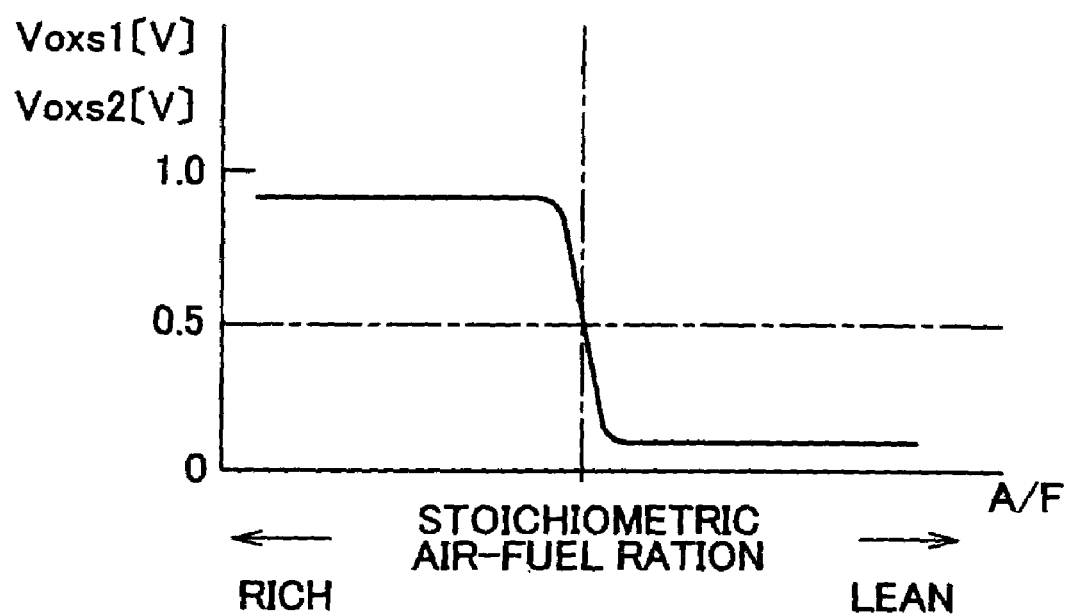
FIG. 4 is a map indicating a relationship between the output voltages of a downstream-of-first catalyst air-fuel ratio sensor and a downstream-of-second catalyst air-fuel ratio sensor shown in FIG. 1 and the air-fuel ratio.

The downstream-of-first catalyst air-fuel ratio sensor 67 and the downstream-of-second catalyst air-fuel ratio sensor 68 are generally-termed concentration cell type oxygen sensors, and are designed to output voltages Voxs1, Voxs2, respectively, that sharply change at the stoichiometric air-fuel ratio. More specifically, as shown in FIG. 4, the downstream-of-first catalyst air-fuel ratio sensor 67 and the downstream-of-second catalyst air-fuel ratio sensor 68 output about 0.1 (V) when the air-fuel ratio is lean of the stoichiometric air-fuel ratio, and output about 0.9 (V) when the air-fuel ratio is rich of the stoichiometric air-fuel ratio, and output about 0.5 (V) when the air-fuel ratio is equal to the stoichiometric air-fuel ratio. The accelerator operation amount sensor 69 is designed to detect the amount of operation of an accelerator pedal 81 operated by a driver, and to output a signal indicating the operation amount Accp of the accelerator pedal 81.

This system further includes an electric control unit 70. The electric control unit 70 is a microcomputer that includes a CPU 71, a ROM 72 in which routines (programs) executed by the CPU 71, tables (look-up tables, maps), constants, etc., are pre-stored, a RAM 73 into which the CPU 71 temporarily stores data when necessary, a backup RAM 74 that stores data when a power supply is on, and that retains the stored data while the power supply is off, an interface 75 that includes an AD converter, etc., which are interconnected by a bus. The interface 75 is connected to the sensors 61 to 69, and supplies signals from the sensors 61 to 69 to the CPU 71, and sends drive signals to the actuator 33a of the variable intake timing device 33, the igniter 38, the injectors 39, the throttle valve actuator 43a, and the SCV actuator 44a.

(Principle of Determination of Catalyst Degradation)

Three-way catalysts, such as the first and second catalysts 53, 54, have the function of oxidizing unburned components (HC, CO) (oxidizing function) and the function of reducing nitrogen oxides (NOx) (reducing function), and are able to substantially remove harmful components, including the unburned components and nitrogen oxides, due to the oxidizing and reducing functions. The efficiency of removal of harmful components by the oxidizing and reducing functions of the three-way catalyst increases as the internal combustion engine air-fuel ratio approaches the vicinity of the stoichiometric air-fuel ratio. Therefore, if the engine air-fuel ratio is kept within a window range that contains the stoichiometric air-fuel ratio, the removal efficiency can be kept at or above a predetermined high value.

Furthermore, the three-way catalyst also has the oxygen storing and releasing functions. Due to the oxygen storing and releasing functions, the catalyst is able to substantially remove HC, CO and NOx even if the air-fuel ratio deviates from the stoichiometric air-fuel ratio to a certain extent. That is, if the engine air-fuel ratio becomes lean of the stoichiometric air-fuel ratio and the gas flowing into the three-way catalyst comes to contain a large amount of NOx, the three-way catalyst detaches oxygen molecules from NOx and therefore reduces NOx, that is, removes NOx, and stores the oxygen, due to its oxygen storing function. If the engine air-fuel ratio becomes rich of the stoichiometric air-fuel ratio and the gas flowing into the three-way catalyst comes to contain large amounts of HC and CO, the catalyst oxidizes and therefore removes HC and CO by giving them stored oxygen due to the oxygen releasing function of the catalyst.

Therefore, in order to efficiently remove large amounts of HC and CO continuously flowing into the three-way catalyst, the catalyst needs to have a large amount of stored oxygen. Conversely, in order to efficiently remove a large amount of NOx continuously flowing into the three-way catalyst, the catalyst needs to be in a state where the catalyst is able to store a sufficiently large amount of oxygen.

As is apparent from the above discussion, the emissions control capability of the three-way catalyst is dependent on the maximum oxygen storage amount, that is, the maximum amount of oxygen that the three-way catalyst is able to store (absorb). However, the three-way catalyst degrades due to the poisoning caused by lead, sulfur and the like contained in fuel, or heat given to the catalyst. Therefore, the maximum oxygen storage amount of the catalyst gradually decreases. That is, if the maximum oxygen storage amounts of the first and second catalysts 53, 54 are estimated, it becomes possible to determine whether the catalysts have degraded, separately for the individual catalysts. Furthermore, on the basis of the combination of results of the determination, it is possible to determine degradation of a catalyst device that is formed by the first and second catalysts 53, 54.

Therefore, the catalyst degradation determining apparatus of the embodiment estimates maximum oxygen storage amounts of the first and second catalysts 53, 54 by forcibly changing the air-fuel ratio of gas upstream of the first catalyst 53 from the fuel-rich side to the fuel-lean side of the stoichiometric air-fuel ratio (or in the opposite direction), as described below. In this case, harmful components are likely to be emitted immediately after the switch of the upstream-of-first catalyst air-fuel ratio from a rich air-fuel ratio to a lean air-fuel ratio (or in the opposite direction) as mentioned above. Therefore, at this time point, it is necessary to lessen the emission of harmful components. Furthermore, it is preferable that the period needed to estimate the oxygen storage amount be short.

Figure 5:
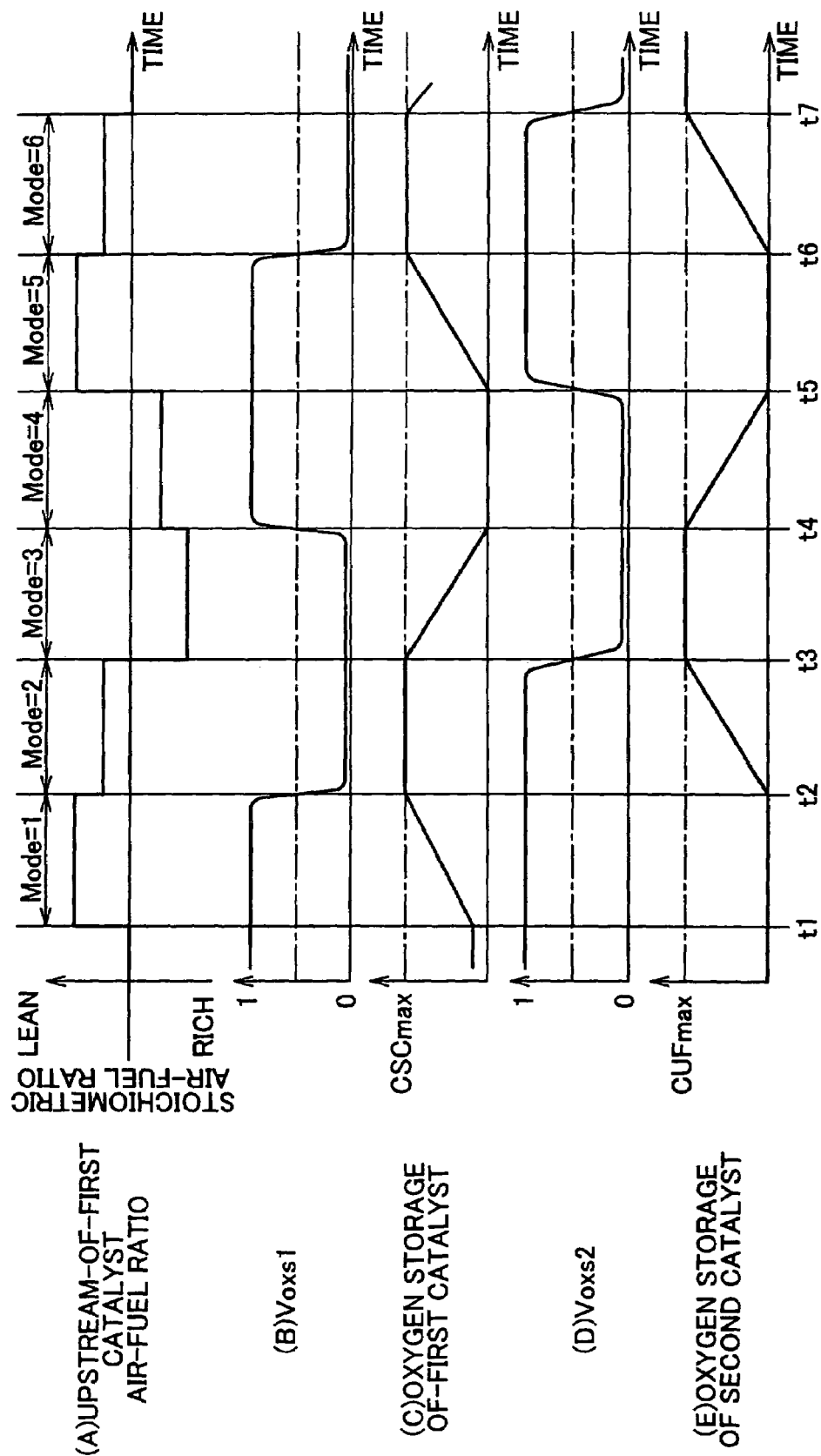
FIG. 5 is a time chart indicating changes in the controlled upstream-of-first catalyst air-fuel ratio, the outputs of the air-fuel ratio sensors and the amounts of oxygen stored in catalysts during the execution of determination regarding catalyst degradation by the catalyst degradation determining apparatus.

Considering the aforementioned requirements, the apparatus of the embodiment minimizes the emission of harmful components, and estimates the maximum oxygen storage amounts of the first and second catalysts 53, 54 within a relatively short period of time as indicated in time charts of FIGS. 5. First, at a time point t1, as indicated in (A) of FIG. 5, the apparatus controls the air-fuel ratio of gas upstream of the first catalyst 53 (which in reality is the air-fuel ratio of a mixture taken into the internal combustion engine, and will sometimes be referred to as "upstream-of-first catalyst air-fuel ratio" in the following description) to a first lean air-fuel ratio that is lean of the stoichiometric air-fuel ratio. The first lean air-fuel ratio is set at an air-fuel ratio that is slightly above the upper limit value of the window range at the time of brand new condition of a catalyst device that is a unit of the first and second catalysts 53, 54.

Therefore, since a gas having a lean air-fuel ratio flows into the first catalyst 53, the amount of oxygen stored in the first catalyst 53 gradually increases, and reaches the maximum oxygen storage amount CSCmax at a time point t2 as indicated in (C) of FIG. 5. As a result, at the time point t2, a gas containing oxygen (lean air-fuel ratio gas) starts to flow out of the first catalyst 53, and the output Voxs1 of the downstream-of-first catalyst air-fuel ratio sensor 67 changes from a rich state-indicating value to a lean state-indicating value as indicated in (B) of FIG. 5. The operation performed between the time points t1 and t2 is termed operation in the first mode (Mode=1). As the output Voxs1 of the downstream-of-first catalyst air-fuel ratio sensor 67 changes from the rich state-indicating value to the lean state-indicating value at the time point t2, the apparatus stores the value of output VabyfsL of the upstream-most air-fuel ratio sensor 66 occurring at the end of the first mode (Mode=1) (i.e., during the state where the upstream-of-first catalyst air-fuel ratio is controlled to the first lean air-fuel ratio) into a variable VabyfsL, and then controls the upstream-of-first catalyst air-fuel ratio to a second lean air-fuel ratio that is lean of the stoichiometric air-fuel ratio and that is rich of the first lean air-fuel ratio (see (A) of FIG. 5).

The second lean air-fuel ratio is changed in accordance with the value of a maximum oxygen storage amount CRaxall of the entire catalyst device, that is, the sum of the value of maximum oxygen storage amount CUFmax of the second catalyst 54 and the value of the maximum oxygen storage amount CSCmax of the first catalyst 53 estimated by the apparatus during the previous catalyst degradation determining operation. The second lean air-fuel ratio is set (relatively great) so as to approach an air-fuel ratio near the upper limit value of the window range provided at the time of brand new condition of the catalyst device as the value of maximum oxygen storage amount Cmaxall increases, and is set (relatively small) so as to approach the stoichiometric air-fuel ratio as the value of maximum oxygen storage amount Cmaxall decreases (as the degradation of the first catalyst 53 and the second catalyst 54 (catalyst device) progresses). As a result, the second lean air-fuel ratio is set so as to become an air-fuel ratio near the upper limit value of the window range provided at a given time, which window range narrows in accordance with the degree of degradation of the catalyst device.

In this state, therefore, a gas having a lean air-fuel ratio flows into the first catalyst 53, and the oxygen storage amount of the first catalyst 53 is maximum and no more oxygen can be stored into the first catalyst 53. Therefore, an oxygen-containing gas continues flowing out of the first catalyst 53. As a result, from the time point t2 on, the oxygen storage amount of the second catalyst 54 gradually increases, and reaches the maximum oxygen storage amount CUFmax at a time point t3, as indicated in (E) of FIG. 5. Therefore, at the time point t3, an oxygen-containing gas starts to flow out of the second catalyst 54, and the output Voxs2 of the downstream-of-second catalyst air-fuel ratio sensor 68 changes from a rich state-indicating value to a lean state-indicating value as indicated in (D) of FIG. 5. The operation performed between the time points t2 and t3 is termed operation in the second mode (Mode=2).

As described above, during the first and second modes (Mode=1, Mode=2), the air-fuel ratio of gas upstream of the first catalyst 53 is controlled to the lean side of the stoichiometric air-fuel ratio so that the first catalyst 53 stores oxygen therein up to the limit of the oxygen storage capability thereof, and the second catalyst 54 stores oxygen therein up to the limit of the oxygen storage capability thereof, respectively.

As the output Voxs2 of the downstream-of-second catalyst air-fuel ratio sensor 68 changes from the rich state-indicating value to the lean state-indicating value at the time point t3, the apparatus controls the upstream-of-first catalyst air-fuel ratio to a first rich air-fuel ratio that is rich of the stoichiometric air-fuel ratio. The first rich air-fuel ratio is set at an air-fuel ratio that is slightly below the lower limit value of the window range provided at the time of brand new condition of the catalyst device that is a unit of the first and second catalysts 53, 54.

Therefore, a rich air-fuel ratio gas flows into the first catalyst 53, so that oxygen stored in the first catalyst 53 is consumed to oxidize the unburned components, that is, HC and CO, which enter the first catalyst 53. Hence, the oxygen storage amount of the first catalyst 53 decreases from the maximum oxygen storage amount CSCmax. Then, at a time point t4, the oxygen storage amount of the first catalyst 53 reaches "0". Therefore, a rich air-fuel ratio gas starts to flow out of the first catalyst 53, and the output Voxs1 of the downstream-of-first catalyst air-fuel ratio sensor 67 changes from a lean state-indicating value to a rich state-indicating value. The operation performed between the time points t3 and t4 is termed operation in the third mode (Mode=3).

During the period between the time points t3 and t4, the apparatus estimates the maximum oxygen storage amount CSCmax of the first catalyst 53 as a maximum oxygen storage amount CSCmax3 as described below. That is, during the period from the time point t3 when the upstream-of-first catalyst air-fuel ratio is set at the first rich air-fuel ratio to the time point t4 when the output Voxs1 of the downstream-of-first catalyst air-fuel ratio sensor 67 changes to the rich state-indicating value, the apparatus calculates amounts of change $\Delta O2$ in the oxygen storage amount and accumulates the amounts of change $\Delta O2$ as in mathematical expressions 1 and 2, thereby calculating the accumulated value at the time point t4 as a maximum oxygen storage amount CSCmax3.

$$\Delta O2 = 0.23 \times mfr \times (\text{stoich} - abyfs) \quad \text{[Expression 1]}$$

$$CSCmax3 = \Sigma \Delta O2 (\text{time section } t = t3 \text{ to } t4) \quad \text{[Expression 2]}$$

In mathematical expression 1, the value "0.23" is the weight proportion of oxygen contained in the atmosphere mfr is the total of fuel injection amount Fi within a predetermined time (calculation cycle tsample), and stoich is the stoichiometric air-fuel ratio (e.g., 14.7). abyfs is the air-fuel ratio A/F detected by the upstream-most air-fuel ratio sensor 66 in the predetermined time tsample. abyfs may be the mean value of the air-fuel ratios A/F detected by the upstream-most air-fuel ratio sensor 66 within the predetermined time tsample.

As indicated in mathematical expression 1, the multiplication of the total mfr of the fuel injection amount Fi within the predetermined time tsample by the shift (stoich–abvfs) of the detected air-fuel ratio A/F from the stoichiometric air-fuel ratio provides the shortfall of air in the predetermined time tsample, and the multiplication of the shortfall of air by the weight proportion of oxygen provides the amount of change ΔO2 in the oxygen storage amount (i.e, amount of consumption of stored oxygen) in the predetermined time tsample. Then, as indicated in mathematical expression 2, the accumulation of the amounts of change ΔO2 in the oxygen storage amount over the time of t3 to t4 provides an estimate of the amount of oxygen consumed during the period starting at the state where the amount of oxygen stored in the first catalyst 53 is maximum and ending at the complete consumption of the oxygen, that is, the maximum oxygen storage amount CSCmax3. Thus, in this embodiment, the maximum oxygen storage amount CSCmax3 is estimated on the basis of the output of the upstream-most air-fuel ratio sensor 66 (by utilizing the fact that the upstream-of-first catalyst air-fuel ratio is controlled to the first rich air-fuel ratio).

As the output of the downstream-of-first catalyst air-fuel ratio sensor 67 changes from the lean state-indicating value to the rich state-indicating value at the time point t4, the apparatus stores the value of output VabyfsL of the upstream-most air-fuel ratio sensor 66 occurring at the end of the third mode (Mode=3) (i.e., during the state where the upstream-of-first catalyst air-fuel ratio is controlled to the first rich air-fuel ratio) into a variable VabyfsR, and then controls the upstream-of-first catalyst air-fuel ratio to a second rich air-fuel ratio that is rich of the stoichiometric air-fuel ratio and that is lean of the first rich air-fuel ratio.

The second rich air-fuel ratio is changed in accordance with the value of the maximum oxygen storage amount CRaxall of the entire catalyst device estimated by the apparatus during the previous catalyst degradation determining operation. The second rich air-fuel ratio is set (relatively small) so as to approach an air-fuel ratio near the lower limit value of the window range provided at the time of brand new condition of the catalyst device as the value of maximum oxygen storage amount Cmaxall increases, and is set (relatively large) so as to approach the stoichiometric air-fuel ratio as the value of maximum oxygen storage amount Cmaxall decreases (as the degradation of the first catalyst 53 and the second catalyst 54 (catalyst device) progresses). As a result, the second rich air-fuel ratio is set so as to become an air-fuel ratio near the lower limit value of the window range provided at a given time, which window range narrows in accordance with the degree of degradation of the catalyst device.

At this time, the oxygen storage amount of the first catalyst 53 is "0", and therefore, a rich air-fuel ratio gas flows into the second catalyst 54. As a result, oxygen stored in the second catalyst 54 is consumed to oxidize the unburned components, that is, HC and CO, which enter the second catalyst 54. Therefore, the oxygen storage amount of the second catalyst 54 decreases from the maximum oxygen storage amount CUFmax.

Then, at a time point t5, the amount of oxygen stored in the second catalyst 54 reaches "0". Therefore, a rich air-fuel ratio gas starts to flow out of the second catalyst 54, and the output Voxs2 of the downstream-of-second catalyst air-fuel ratio sensor 68 changes from a lean state-indicating value to a rich state-indicating value. That is, during the period between the time points t3 and t5, the air-fuel ratio of gas upstream of the first catalyst 53 is controlled to the rich side of the stoichiometric air-fuel ratio so that the oxygen stored in the first catalyst 53 is completely released during the period between the time points t3 and t4, and the oxygen stored in the second catalyst 54 is completely released during the period between the time points t4 and t5. The operation performed between the time points t4 and t5 is termed operation in the fourth mode (Mode=4).

During the period between the time points t4 and t5, the apparatus calculates and estimates the maximum oxygen storage amount CUFmax of the second catalyst 54 as a maximum oxygen storage amount CUFmax4 through calculations as in mathematical expressions 3 and 4, which are similar to those used in the above-described calculation of the maximum oxygen storage amount CSCmax3. Thus, in this embodiment, the maximum oxygen storage amount CUFmax4 is estimated on the basis of the output of the upstream-most air-fuel ratio sensor 66 (by utilizing the fact that the upstream-of-first catalyst air-fuel ratio is controlled to the second rich air-fuel ratio).

$$\Delta O2 = 0.23 \times mfr \times (\text{stoich} - abyfs) \qquad [\text{Expression 3}]$$

$$CUFmax4 = \Sigma \Delta O2(\text{time section} = t4 \text{ to } t5) \qquad [\text{Expression 4}]$$

As the output Voxs2 of the downstream-of-second catalyst air-fuel ratio sensor 68 changes from the lean state-indicating value to the rich state-indicating value at the time point t5, the apparatus controls the upstream-of-first catalyst air-fuel ratio to the aforementioned first lean air-fuel ratio that is lean of the stoichiometric air-fuel ratio. Therefore, a lean air-fuel ratio gas flows into the first catalyst 53. At the time point t5, the oxygen storage amount of the first catalyst 53 is "0". Therefore, the amount of oxygen stored in the first catalyst 53 continuously increases from "0" from the time point t5 on, and reaches the maximum oxygen storage amount CSCmax at a time point t6. As a result, at the time point t6, an oxygen-containing gas starts to flow out of the first catalyst 53, and the output Voxs1 of the downstream-of-first catalyst air-fuel ratio sensor 67 changes from a rich state-indicating value to a lean state-indicating value. The operation performed between the time points t5 and t6 is termed operation in the fifth mode (Mode=5).

During the period between the time points t5 and t6, too, the apparatus estimates the maximum oxygen storage amount CSCmax of the first catalyst 53 as a maximum oxygen storage amount CSCmax5 as described below. That is, the time point t6 when the output Voxs1 of the downstream-of-first catalyst air-fuel ratio sensor 67 changes to the lean air-fuel ratio-indicating value is a time point when the oxygen storage amount of the first catalyst 53 reaches the maximum oxygen storage amount CSCmax. Therefore, during the period between the time points t5 and t6, the apparatus calculates and accumulates amounts of change ΔO2 in the oxygen storage amount as in mathematical expressions 5 and 6, thereby calculating and estimating the accumulated value at the time point t6 as the maximum oxygen storage amount CSCmax5.

$$\Delta O2 = 0.23 \times mfr \times (abyfs - \text{stoich}) \qquad [\text{Expression 5}]$$

$$CSCmax5 = \Sigma \Delta O2(\text{time section } t = t5 \text{ to } t6) \qquad [\text{Expression 6}]$$

As indicated in mathematical expression 5, the multiplication of the total mfr of the fuel injection amount within the predetermined time tsample by the shift (abyfs−stoich) of the air-fuel ratio A/F from the stoichiometric air-fuel ratio provides the excess amount of air in the predetermined time tsample, and the multiplication of the excess amount of air by the weight proportion of oxygen provides the amount of change ΔO2 in the oxygen storage amount (i.e, amount of oxygen stored) in the predetermined time tsample. Then, as indicated in mathematical expression 6, the accumulation of the amounts of change ΔO2 in the oxygen storage amount over the time of t5 to t6 provides an estimate of the amount of oxygen stored during the period starting at the state where the amount of oxygen stored in the first catalyst 53 is "0" and ending at the maximum storage of oxygen, that is, the maximum oxygen storage amount CSCmax5. Thus, in this embodiment, the maximum oxygen storage amount CSCmax5 is estimated on the basis of the output of the upstream-most air-fuel ratio sensor 66 (by utilizing the fact that the upstream-of-first catalyst air-fuel ratio is controlled to the first lean air-fuel ratio).

As the output Voxs1 of the downstream-of-first catalyst air-fuel ratio sensor 67 changes from the rich state-indicating value to the lean state-indicating value at the time point t6, the apparatus controls the upstream-of-first catalyst air-fuel ratio to the aforementioned second lean air-fuel ratio that is lean of the stoichiometric air-fuel ratio and that is rich of the first lean air-fuel ratio. In this case, the oxygen storage amount of the first catalyst 53 has reached the maximum oxygen storage amount CSCmax. Therefore, a lean air-fuel ratio gas flows out of the first catalyst 53, and flows into the second catalyst 54. At the time point t6, the oxygen storage amount of the second catalyst 54 is "0". Therefore, the amount of oxygen stored in the second catalyst 54 continuously increases from "0" from the time point t6 on, and reaches the maximum oxygen storage amount CUFmax at a time point t7. As a result, at the time point t7, an oxygen-containing gas starts to flow out of the second catalyst 54, and the output Voxs2 of the downstream-of-second catalyst air-fuel ratio sensor 68 changes from a rich state-indicating value to a lean state-indicating value. The operation performed between the time points t6 and t7 is termed operation in the sixth mode (Mode=6).

During the period between the time points t6 and t7, too, the apparatus estimates the maximum oxygen storage amount CUFmax of the second catalyst 54 as a maximum oxygen storage amount CUFmax6 as described below. That is, the apparatus calculates and accumulates amounts of change $\Delta O2$ in the oxygen storage amount as in mathematical expressions 7 and 8, thereby determining the accumulated value at the time point t7 as a maximum oxygen storage amount CUFmax6.

$$\Delta O2 = 0.23 \times mfr \times (abyfs - \text{stoich}) \quad [\text{Expression 7}]$$

$$CUFmax6 = \Sigma \Delta O2 \text{(time section } t=t6 \text{ to } t7) \quad [\text{Expression 8}]$$

Thus, in this embodiment, the maximum oxygen storage amount CUFmax6 is estimated on the basis of the output of the upstream-most air-fuel ratio sensor 66 (by utilizing (i.e., in consideration of) the fact that the upstream-of-first catalyst air-fuel ratio is controlled to the second lean air-fuel ratio). Then, at a time point t7, the apparatus returns the air-fuel ratio of a mixture taken into the internal combustion engine to the stoichiometric air-fuel ratio. From the time point t7 on, the apparatus determines whether the upstream-most air-fuel ratio sensor 66 has abnormality by determining whether mathematical expression 9 is satisfied.

$$((vabyfsL - vabyfsR)/dvref) < \alpha \quad [\text{Expression 9}]$$

In mathematical expression 9, dvref in the left side, as indicated in FIG. 3, is a deviation (positive constant value) between the value of output vabyfs of the upstream-most air-fuel ratio sensor 66 occurring when the detected air-fuel ratio A/F of gas is the first lean air-fuel ratio (stoich/0.98) and the value of output vabyfs of the upstream-most air-fuel ratio sensor 66 occurring when the detected air-fuel ratio A/F is the first rich air-fuel ratio (stoich/1.02) in the case where the upstream-most air-fuel ratio sensor 66 is normal. In mathematical expression 9, $\alpha$ in the right side is a criterion (positive constant value) for the determination regarding degradation of the upstream-most air-fuel ratio sensor.

As degradation of the upstream-most air-fuel ratio sensor 66 progresses, there is a tendency as indicated by a two-dot chain line in FIG. 3, that is, the amount of shift (absolute value thereof) of the value of output of the upstream-most air-fuel ratio sensor 66 from the value of output of the sensor 66 occurring when the air-fuel ratio A/F of gas is the stoichiometric air-fuel ratio with respect to the amount of shift of the actual air-fuel ratio A/F of the gas subjected to the detection by the upstream-most air-fuel ratio sensor 66 from the stoichiometric air-fuel ratio (stoich) tends to decrease.

Therefore, the deviation (vabyfsL−vabyfsR) between the value of variable vabyfsL storing the value of output vabyfs of the upstream-most air-fuel ratio sensor 66 occurring in the case where the upstream-of-first catalyst air-fuel ratio is controlled to the first lean air-fuel ratio, and the value of variable vabyfsR storing the value of output vabyfs of the upstream-most air-fuel ratio sensor 66 occurring in the case where the upstream-of-first catalyst air-fuel ratio is controlled to the first rich air-fuel ratio decreases in accordance with progress of the degradation of the upstream-most air-fuel ratio sensor 66. That is, the ratio ((vabyfsL−vabyfsR)/dvref) of the value of deviation (vabyfsL−vabyfsR) to the value of deviation dvref decreases in accordance with progress of the degradation of the upstream-most air-fuel ratio sensor 66.

On the basis of the above-described principle, the apparatus determines that the upstream-most air-fuel ratio sensor 66 is abnormal (has degraded) if mathematical expression 9 holds, that is, if the ratio ((vabyfsL−vabyfsR)/dvref) of the value of deviation (vabyfsL−vabyfsR) to the value of deviation dvref is less than the criterion $\alpha$ for determination regarding degradation of the upstream-most air-fuel ratio sensor 66.

Then, the apparatus determines whether the first and second catalysts 53, 54 have degraded as described below. First, with regard to the first catalyst 53, the apparatus determines whether the maximum oxygen storage amount CSCmax3 of the first catalyst 53 is less than or equal to a first catalyst degradation criterion CSCRdn, and whether the maximum oxygen storage amount CSCmax5 of the first catalyst 53 is less than or equal to a first catalyst degradation criterion CSCRup, and whether a mean maximum oxygen storage amount CSCmax of the first catalyst 53 (=(CSCmax3+CSCmax5)/2), that is, a mean value of the maximum oxygen storage amount CSCmax3 and the maximum oxygen storage amount CSCmaxS, is less than or equal to a first catalyst degradation criterion CSCRave.

Then, the apparatus determines, in principle, that the first catalyst 53 has degraded if fulfillment is achieved of any one of the condition that the maximum oxygen storage amount CSCmax3 is less than or equal to the first catalyst degradation criterion CSCRdn, the condition that the maximum oxygen storage amount CSCmax5 is less than or equal to the first catalyst degradation criterion CSCRup, and the condition that the mean maximum oxygen storage amount CSCmax is less than or equal to the first catalyst degradation criterion CSCRave. It is also possible to adopt a construction in which it is determined that the first catalyst 53 has degraded if an arbitrary combination of two of the three conditions is fulfilled, or a construction in which it is determined that the first catalyst 53 has degraded if all three conditions are fulfilled. However, if it is determined that the upstream-most air-fuel ratio sensor 66 is abnormal, the apparatus avoids (i.e., is prohibited from) determining that the first catalyst 53 has degraded.

Next, with regard to the second catalyst 54, the apparatus determines whether the maximum oxygen storage amount CUFmax4 of the second catalyst 54 is less than or equal to a second catalyst degradation criterion CUFRdn, and whether the maximum oxygen storage amount CUFmax6 of the second catalyst 54 is less than or equal to a second catalyst degradation criterion CUFRup, and whether a mean maximum oxygen storage amount CUFmax of the second catalyst 54 (=(CUFmax4+CUFmax6)/2), that is, a mean value of the maximum oxygen storage amount CUFmax4 and the maximum oxygen storage amount CUFmax6, is less than or equal to a second catalyst degradation criterion CUFRave.

Then, the apparatus determines, in principle, that the second catalyst 54 has degraded if fulfillment is achieved of any one of the condition that the maximum oxygen storage amount CUFmax4 is less than or equal to the second catalyst degradation criterion CUFRdn, the condition that the maximum oxygen storage amount CUFmax6 is less than or equal to the second catalyst degradation criterion CUFRup, and the condition that the mean maximum oxygen storage amount CUFmax is less than or equal to the second catalyst degradation criterion CUFRave. In this case, too, it is possible to adopt a construction in which it is determined that the second catalyst 54 has degraded if an arbitrary combination of two of the three conditions is fulfilled, or a construction in which it is determined that the second catalyst 54 has degraded if all three conditions are fulfilled. However, if it is determined that the upstream-most air-fuel ratio sensor 66 is abnormal, the apparatus avoids (i.e., is prohibited from) determining that the second catalyst 54 has degraded, as in the above-described case.

Furthermore, the apparatus determines whether the catalyst device as a unit of the first and second catalysts 53, 54 has degraded by determining whether mathematical expression 10 is satisfied. In this case, too, the apparatus avoids determining that the catalyst device has degraded, if it has been determined that the upstream-most air-fuel ratio sensor 66 is abnormal.

$$CSCmax + CUFmax \leq CRave \quad \text{[Expression 10]}$$

In mathematical expression 10, CSCmax in the left side may be replaced by CSCmax3 or CSCmax5, and CUFmax may be replaced by CUFmax4 or CUFmax6. CRave in the right side is a reference value of the maximum oxygen storage amount for the determination regarding degradation of the catalyst device that is a unit of the first and second catalysts 53, 54 (entire catalyst degradation criterion). Above described is a summary of the catalyst degradation determining method employed by the apparatus.

<Actual Operation>

Actual operations of the emissions control apparatus (and the catalyst degradation determining apparatus) constructed as described above will be described below with reference to FIGS. 6 to 17 showing flowcharts illustrating routines (programs) executed by the CPU 71 of the electronic control unit 70.

(Ordinary Air-Fuel Ratio Control)

Figure 6:
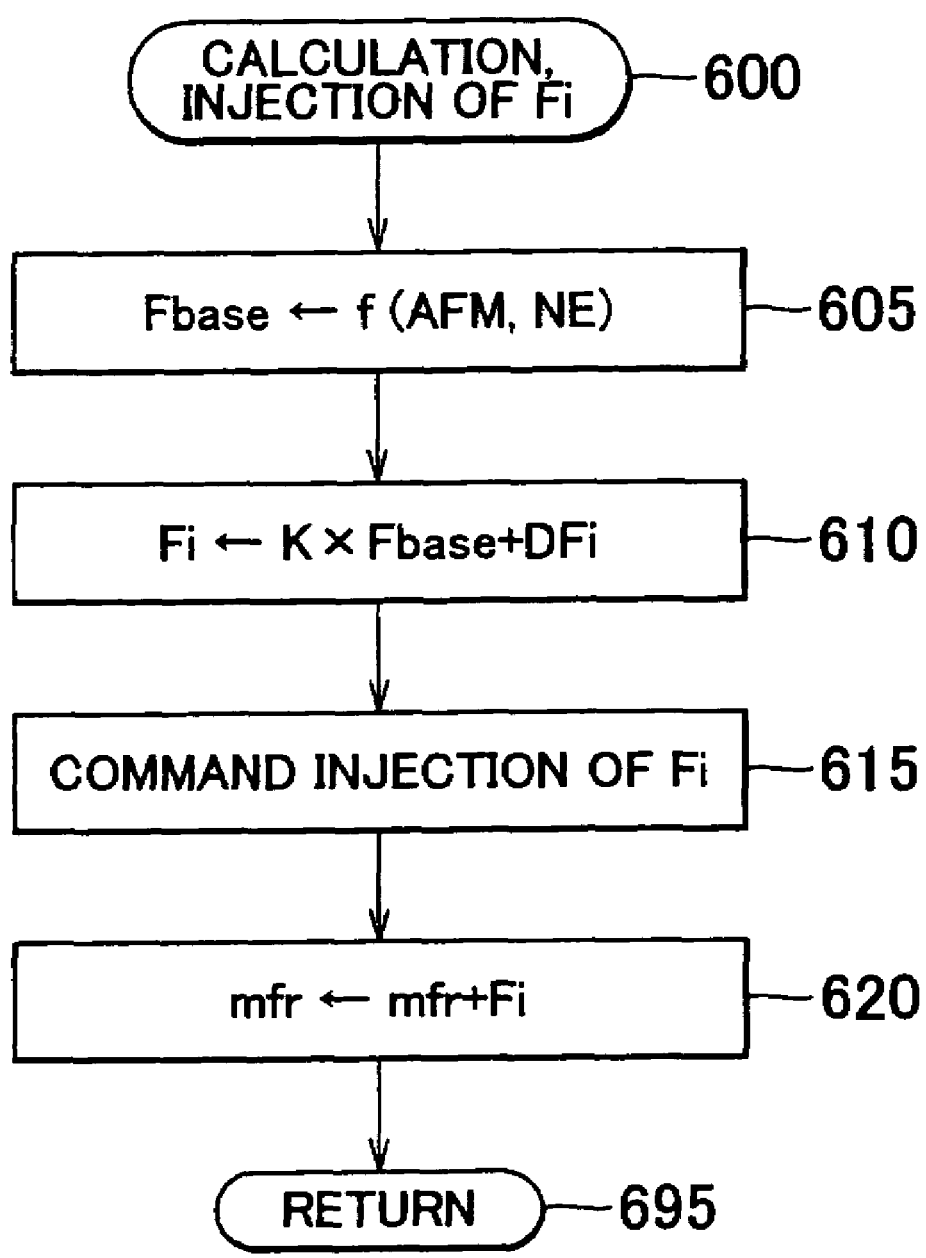
FIG. 6 is a flowchart illustrating a routine for calculating the amount of fuel injection executed by a CPU shown in FIG. 1.

The CPU 71 executes the routine of FIG. 6 for calculating the final fuel injection amount Fi and commanding fuel injection, every time the crank angle of any one of the cylinders reaches a predetermined crank angle preceding the intake stroke top dead center (e.g., BTDC 90° CA). Therefore, when the crank angle of an arbitrary cylinder reaches the predetermined crank angle, the CPU 71 starts the routine at step S600, and proceeds to step S605, in which the CPU 71 determines a basic fuel injection amount Fbase for setting the internal combustion engine air-fuel ratio at the stoichiometric air-fuel ratio from a map on the basis of the intake air amount AFM measured by the air flow meter 61 and the engine rotation speed NE.

Subsequently in step S610, the CPU 71 sets, as a final fuel injection amount Fi, the value obtained by adding a below-described air-fuel ratio feedback correction amount DFi to the multiplication product of the basic fuel injection amount Fbase and a factor K. The value of the factor K is normally "1.00", and is set at a predetermined value other than "1.00" when the air-fuel ratio is to be forcibly changed in order to make a determination regarding catalyst degradation as described above. Subsequently in step S615, the CPU 71 commands the injector 39 to inject the final fuel injection amount Fi of fuel. After that, in step S620, the CPU 71 sets the value obtained by adding the final fuel injection amount Fi to the present fuel injection total amount mfr, as a new fuel injection accumulated amount mfr. The fuel injection accumulated amount mfr is used in the calculation of the oxygen storage amount described below. After that, in step S695, the CPU 71 temporarily ends the routine. Through the above-described operation, the feedback-corrected final fuel injection amount Fi is injected into the cylinder that is about to undergo the intake stroke.

Next described will be calculation of the aforementioned air-fuel ratio feedback correction amount DFi. The CPU 71 executes the routine illustrated in FIG. 7 at every elapse of a predetermined time (i.e., at predetermined time intervals). Therefore, when a predetermined timing is reached, the CPU 71 starts the routine at step S700, and proceeds to step S705, in which the CPU 71 determines whether a feedback control condition is fulfilled. The air-fuel ratio feedback control condition is fulfilled, for example, in the case where the engine cooling water temperature THW is higher than or equal to a first predetermined temperature, and where the amount of intake air (load) per rotation of the internal combustion engine is less than or equal to a predetermined value, and where the upstream-most air-fuel ratio sensor 66 is normal, and where the value of a catalyst degradation determination execution flag XHAN described below is "0". The catalyst degradation determination execution flag XHAN, when the value thereof is "1", indicates that an air-fuel ratio control of forcibly changing the air-fuel ratio for the purpose of determination regarding catalyst degradation is being executed. When the value thereof is "0", the flag XHAN indicates that the air-fuel ratio control for determination regarding catalyst degradation is not being executed.

If description is continued on the assumption that the air-fuel ratio control condition is fulfilled, the CPU 71 makes a determination of "YES" in step S705, and proceeds to step S710. In step S710, the CPU 71 computes a present upstream-side control-purposed air-fuel ratio abyfsl of the first catalyst 53 by converting the sum (vabyfs+vafsfb) of the present output vabyfs of the upstream-most air-fuel ratio sensor 66 and a below-described subsidiary feedback control amount vafsfb on the basis of the map indicated in FIG. 3.

Subsequently in step S715, the CPU 71 computes a cylinder fuel supply Fc(k−N) provided N number of strokes (N number of intake strokes) prior to the present time point by dividing the cylinder intake air amount Mc(k−N), that is, the amount of air taken into the cylinder that underwent the intake stroke at the time of N number of strokes prior to the present time point, by the aforementioned upstream-side control-purposed air-fuel ratio abyfs1. The value N varies depending on the amount of exhaust gas from the internal combustion engine, the distance from the combustion chamber 25 to the upstream-most air-fuel ratio sensor 66, etc.

The reason why the cylinder intake air amount Mc(k−N) provided N number of strokes prior to the present time point is divided by the upstream-side control-purposed air-fuel ratio abyfsl in order to determine the cylinder fuel supply Fc(k−N) provided N number of strokes prior to the present time point is that a time corresponding to N number of strokes is needed for the mixture burned in the combustion chamber 25 to reach the upstream-most air-fuel ratio sensor 66. The cylinder intake air amount Mc is computed at every intake stroke of each cylinder on the basis of the then-occurring output AFM of the air flow meter 61 and the engine rotation speed NE (for example, the amount Mc is computed by dividing a value obtained by performing a primary delay process on the output AFM of the air flow meter 61 by the engine rotation speed NE), and is stored in the RAM 73 corresponding to each intake stroke.

Subsequently in step S720, the CPU 71 computes a target cylinder fuel supply Fcr(k−N) for the time of N number of strokes prior to the present time point by dividing the cylinder intake air amount Mc(k−N) provided N number of strokes prior to the present time point by the target air-fuel ratio abyfr(k−N) provided at the time point of N number of strokes prior to the present time point (stoichiometric air-fuel ratio stoich on this side). Then, in step S725, the CPU 71 sets the value obtained by subtracting the cylinder fuel supply Fc(k−N) from the target cylinder fuel supply Fcr(k−N), as a cylinder fuel supply deviation DFc. That is, the cylinder fuel supply deviation DFc indicates the excess or shortfall of fuel resulting from the supply of fuel into the cylinder at the time point of N number of strokes before. Subsequently in step S730, the CPU 71 computes an air-fuel ratio feedback correction amount DFi as in mathematical expression 11.

$$DFi = (Gp \times DFc + Gi \times SDFc) \times KFB \qquad \text{[Expression 11]}$$

In mathematical expression 11, Gp is a pre-set proportional gain, and Gi is a pre-set integral gain. Furthermore, in mathematical expression 11, although the factor KFB is preferably variable depending on the engine rotation speed NE, the cylinder intake air amount Mc, etc., the factor KFB is set at "1" in this embodiment. Still further, the value SDFc is an integrated value of the cylinder fuel supply deviation DFc, and is updated in step S735. That is, in step S735, the CPU 71 adds the cylinder fuel supply deviation DFc determined in step S725 to the present integrated value SDFc of the cylinder fuel supply deviation DFc, thereby determining a new integrated value SDFc of the cylinder fuel supply deviation. Subsequently in step S795, the CPU 71 temporarily ends the routine.

Thus, the air-fuel ratio feedback correction amount DFi is determined by a proportional-plus-integral control. Since the air-fuel ratio feedback correction amount DFi is reflected in the fuel injection amount in step S610 and step S615 in FIG. 6, the excess or shortfall of fuel supply occurring N number of strokes prior to the present time point, and the mean value of air-fuel ratio is made substantially equal to the target air-fuel ratio abyfr.

If it is determined in step S705 that the air-fuel ratio feedback control condition is not fulfilled, the CPU 71 makes a determination of "NO" in step S705, and proceeds to step S740. In step S740, the CPU 71 sets the value of air-fuel ratio feedback correction amount DFi at "0". Subsequently in step S795, the CPU 71 temporarily ends the routine. Thus, in the case where the air-fuel ratio feedback control condition is not fulfilled (including a case where the catalyst degradation determination is being executed), the CPU 71 sets the air-fuel ratio feedback correction amount DFi at "0", and avoids correction of the air-fuel ratio (basic fuel injection amount Fbase).

Next described will be an air-fuel ratio feedback control based on the output Voxs1 of the downstream-of-first catalyst air-fuel ratio sensor 67. This control is also referred to as "subsidiary feedback control". By the subsidiary feedback control, a subsidiary feedback control amount vafsfb is calculated.

Figure 8:
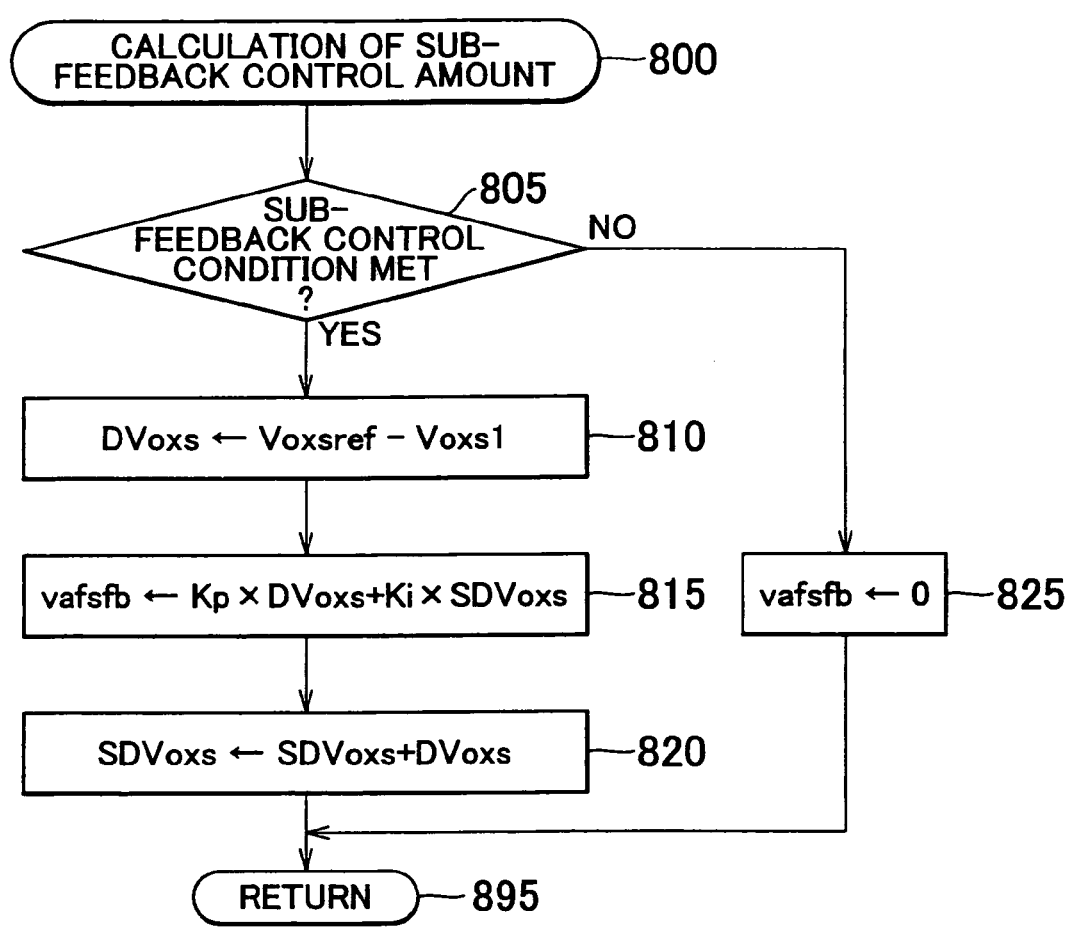
FIG. 8 is a flowchart illustrating a routine for calculating a subsidiary feedback control amount executed by the CPU shown in FIG. 1.

In order to determine the subsidiary feedback control amount vafsfb, the CPU 71 executes a routine illustrated in FIG. 8 at every elapse of a predetermined time. Therefore, when a predetermined timing is reached, the CPU 71 starts the routine at step S800, and proceeds to step S805, in which the CPU 71 determines whether a subsidiary feedback control condition is fulfilled. The subsidiary feedback control condition is fulfilled, for example, in a case where the engine cooling water temperature THW is higher than or equal to a second predetermined temperature that is higher than the first predetermined temperature, and where the downstream-of-first catalyst air-fuel ratio sensor 67 is normal, in addition to fulfillment of the feedback control condition in step S705.

If description is continued on the assumption that the subsidiary feedback control condition is fulfilled, the CPU 71 makes a determination of "YES" in step S805, and proceeds to step S810. In step S810, the CPU 71 computes an output deviation DVoxs by subtracting the present output Voxs1 of the downstream-of-first catalyst air-fuel ratio sensor 67 from a predetermined target value Voxsref. The target value Voxsref is determined so that the emissions control efficiency of the first catalyst 53 becomes good (optimal). In this embodiment, the target value Voxsref is set at a value corresponding to the stoichiometric air-fuel ratio. Subsequently in step S815, the CPU 71 computes a subsidiary feedback control amount vafsfb as in mathematical expression 12.

$$vafsfb = Kp \times DVoxs + Ki \times SDVoxs \qquad \text{[Expression 12]}$$

In mathematical expression 12, Kp is a pre-set proportional gain, and Ki is a pre-set integral gain. Furthermore, the value SDVoxs is an integrated value of output deviation DVoxs, and is updated in step S820. That is, in step S820, the CPU 71 adds the output deviation DVoxs determined in step S810 to the present integrated value SDVoxs of the output deviation, thereby determining a new integrated value SDVoxs of the output deviation. Subsequently in step S895, the CPU 71 temporarily ends the routine.

Thus, the subsidiary feedback control amount vafsfb is determined. This value is added to an actual output of the upstream-most air-fuel ratio sensor 66 in step S710 in FIG. 7, and the sum (vabyfs+vafsfb) is converted into the upstream-side control-purposed air-fuel ratio abyfs1 on the basis of the map indicated in FIG. 3. That is, the upstream-side control-purposed air-fuel ratio abysf1 determined on the basis of the output Voxs1 of the downstream-of-first catalyst air-fuel ratio sensor 67 is determined as an air-fuel ratio that differs from the air-fuel ratio actually detected by the upstream-most air-fuel ratio sensor 66, by an amount corresponding to the subsidiary feedback control amount vafsfb.

Figure 7:
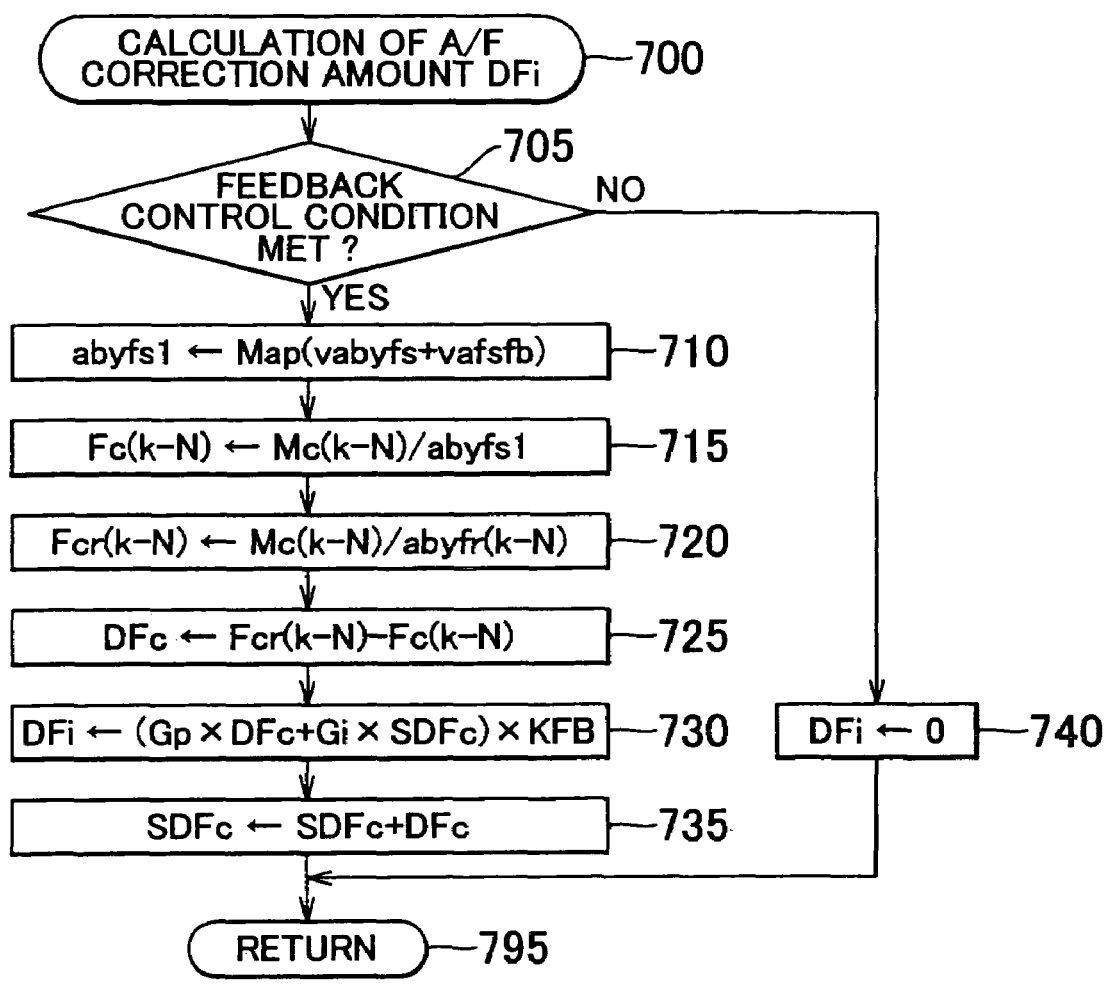
FIG. 7 is a flowchart illustrating a routine for calculating an air-fuel ratio feedback correction amount executed by the CPU shown in FIG. 1.

As a result, since the cylinder fuel supply Fc(k−N) calculated in step S715 in FIG. 7 changes in accordance with the output Voxs1 of the downstream-of-first catalyst air-fuel ratio sensor 67, the air-fuel ratio feedback correction amount DFi is changed in accordance with the output Voxs1 of the downstream-of-first catalyst air-fuel ratio sensor 67 in steps S725 and S730. Thus, the engine air-fuel ratio is controlled so that the air-fuel ratio of gas downstream of the first catalyst 53 becomes equal to the target value Voxsref.

For example, if the output Voxs1 of the downstream-of-first catalyst air-fuel ratio sensor 67 indicates a value corresponding to an air-fuel ratio that is lean of the stoichiometric air-fuel ratio as an average air-fuel ratio that is on the lean side of the stoichiometric air-fuel ratio, the output deviation DVoxs determined in step S810 is a positive value, and therefore the subsidiary feedback control amount vafsfb becomes a positive value. Therefore, the upstream-side control-purposed air-fuel ratio abysfl determined in step S710 is determined as a value that is lean of (greater than) the air-fuel ratio actually detected by the upstream-most air-fuel ratio sensor 66. Hence, the cylinder fuel supply Fc(k–N) determined in step S715 becomes a small value, and the cylinder fuel supply deviation DFc is determined as a great value. Therefore, the air-fuel ratio feedback correction amount DFi becomes a great positive value. Therefore, the final fuel injection amount Fi determined in step S610 in FIG. 6 becomes greater than the basic fuel injection amount Fbase, and a control is performed so that the engine air-fuel ratio becomes rich of the stoichiometric air-fuel ratio.

Conversely, if the output Voxs1 of the downstream-of-first catalyst air-fuel ratio sensor 67 indicates a value corresponding to an air-fuel ratio that is rich of the stoichiometric air-fuel ratio as an average engine air-fuel ratio that is on the rich side of the stoichiometric air-fuel ratio, the output deviation DVoxs determined in step S810 is a negative value, and therefore the subsidiary feedback control amount vafsfb becomes a negative value. Therefore, the upstream-side control-purposed air-fuel ratio abysfl determined in step S710 is determined as a value that is rich of (less than) the air-fuel ratio actually detected by the upstream-most air-fuel ratio sensor 66. Hence, the cylinder fuel supply Fc(k–N) determined in step S715 becomes a great value, and the cylinder fuel supply deviation DFc is determined as a negative value. Therefore, the air-fuel ratio feedback correction amount DFi becomes a negative value. Therefore, the final fuel injection amount Fi determined in step S610 in FIG. 6 becomes less than the basic fuel injection amount Fbase, and a control is performed so that the engine air-fuel ratio becomes lean of the stoichiometric air-fuel ratio.

Thus, a control is performed so that the air-fuel ratio of gas downstream of the first catalyst 53 becomes very close to the stoichiometric air-fuel ratio. Therefore, emissions are continuously lessened even in a case where the first and second catalysts 53, 54 have degraded and the maximum oxygen storage amount CSCmax and the maximum oxygen storage amount CUFmax have decreased.

If it is determined in step S805 that the subsidiary feedback control condition is not fulfilled, the CPU 71 makes a determination of "NO" in step S805, and proceeds to step S825. In step S825, the CPU 71 sets the value of subsidiary feedback control amount vafsfb at "0". Subsequently in step S895, the CPU 71 temporarily ends the routine. Thus, in the case where the subsidiary feedback control condition is not fulfilled (including a case where an air-fuel ratio switching control is being executed), the CPU 71 sets the subsidiary feedback control amount vafsfb at "0", and avoids correction of the air-fuel ratio feedback correction amount DFi (upstream-side control-purposed air-fuel ratio abysfl) based on the output Voxs1 of the downstream-of-first catalyst air-fuel ratio sensor 67. The ordinary air-fuel ratio control is executed in the above-described manner.

(Air-Fuel Ratio Control for Determination Regarding Catalyst Degradation)

Next described will be an air-fuel ratio control for determination regarding catalyst degradation. The CPU 71 executes each of the routines illustrated by the flowcharts of FIG. 9 to FIG. 15 at every elapse of a predetermined time.

Figure 9:
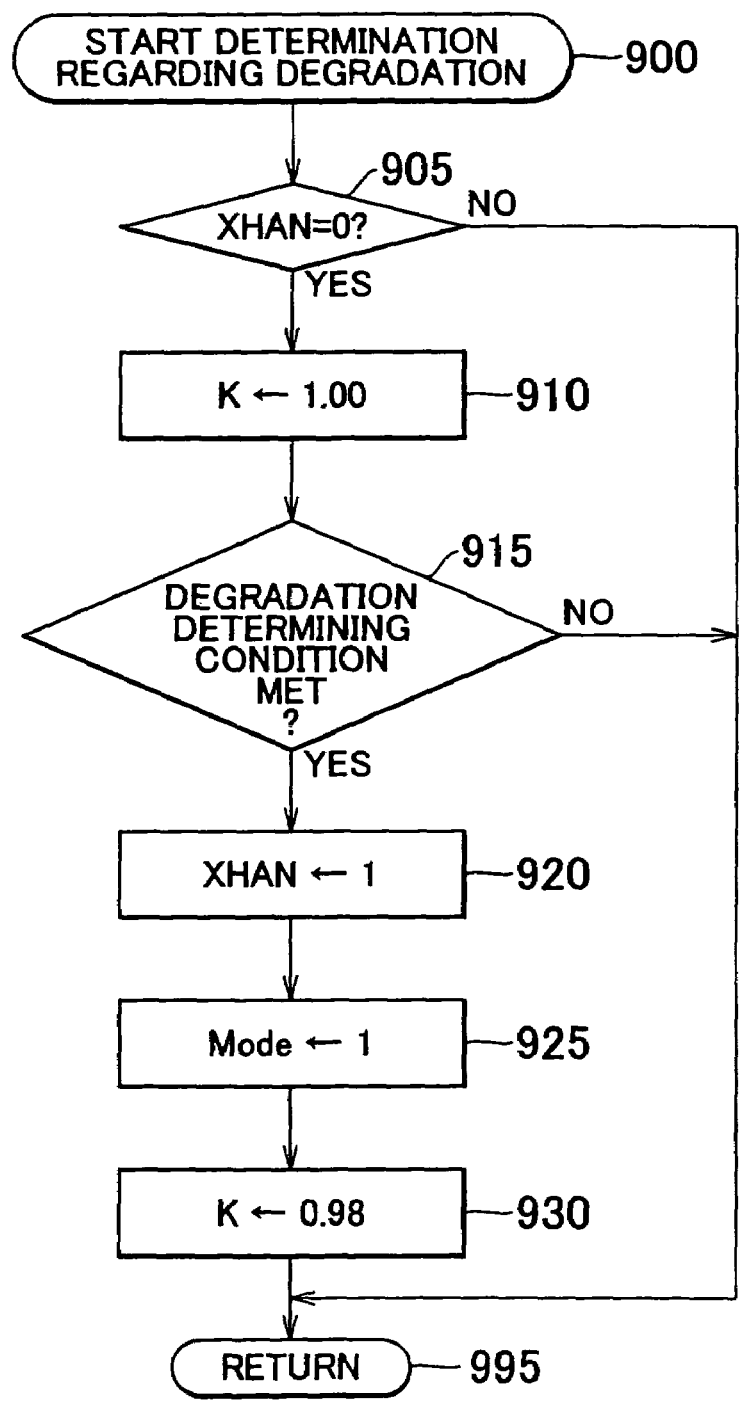
FIG. 9 is a flowchart illustrating a routine for determining whether to start the determination regarding catalyst degradation executed by the CPU shown in FIG. 1.

When a predetermined timing is reached, the CPU 71 starts the routine in step S900 in FIG. 9, and proceeds to step S905, in which the CPU 71 determines whether the value of the catalyst degradation determination execution flag XHAN is "0". If description is continued on the assumption that the air-fuel ratio control for determination regarding catalyst degradation is not being executed, and that a catalyst degradation determining condition is not fulfilled, the value of the catalyst degradation determination execution flag XHAN is "0". Therefore, the CPU 71 makes a determination of "YES" in step S905, and proceeds to step S910, in which the CPU 71 sets the value of the factor K used in step S610 in FIG. 6 at 1.00.

Subsequently in step S915, the CPU 71 determines whether the catalyst degradation determining condition is fulfilled. The catalyst degradation determining condition is fulfilled in the case where the cooling water temperature THW is higher than or equal to a predetermined temperature, and where the vehicle speed acquired via a vehicle speed sensor (not shown) is higher than or equal to a predetermined vehicle speed, and where the internal combustion engine is in a steady operation with the per-unit-time amount of change in the throttle valve opening TA being less than or equal to a predetermined amount. It is also possible to add to the catalyst degradation determining condition, any one or two or more of a condition that a predetermined time has elapsed following the previous catalyst degradation determination, a condition that the vehicle has traveled at least a predetermined distance following the previous catalyst degradation determination, and a condition that the internal combustion engine 10 has been operated for at least a predetermined time following the previous catalyst degradation determination. At the present stage, the catalyst degradation determining condition is not fulfilled as mentioned above. Therefore, the CPU 71 makes a determination of "NO" in step S915, and proceeds to step S995, in which the CPU 71 temporarily ends the routine.

Description will be further continued on the assumption that the catalyst degradation determining condition is fulfilled although the air-fuel ratio control for determination regarding catalyst degradation is not performed at the present time point as in the case of the time point t1 in FIG. 5. In this case, the CPU 71 makes a determination of "YES" in step S905, and proceeds to step S910, in which the CPU 71 sets the value of the factor K at 1.00. Subsequently in step S915, the CPU 71 makes a determination of "YES" since the catalyst degradation determining condition is fulfilled. Subsequently in step S920, the CPU 71 sets the value of the catalyst degradation determination execution flag XHAN to "1".

Subsequently in step S925, the CPU 71 sets the value of Mode at "1" in order to enter the first mode. Subsequently in step S930, the CPU 71 sets the value of the factor K at 0.98. Then, in step S995, the CPU 71 temporarily ends the routine. As a result, the aforementioned air-fuel ratio feedback control condition becomes unfulfilled. Therefore, the CPU 71 makes a determination of "NO" in step S705 in FIG. 7, and proceeds to step S740, in which the air-fuel ratio feedback correction amount DFi is set at "0". As a result, due to execution of step S610 in FIG. 6, the value obtained by multiplying basic fuel injection amount Fbase by 0.98 is computed as a final fuel injection amount Fi. Since the thus-determined final fuel injection amount Fi is injected, the internal combustion engine air-fuel ratio is controlled to the first lean air-fuel ratio that is lean of the stoichiometric air-fuel ratio.

After that, the CPU 71 repeatedly executes the processing of the routine of FIG. 9 starting at step S900. However, since the value of the catalyst degradation determination execution flag XHAN is "1", the CPU 71 makes a determination of "NO" in step S905, and immediately proceeds to step S995, in which the CPU 71 temporarily ends the routine.

Figure 10:
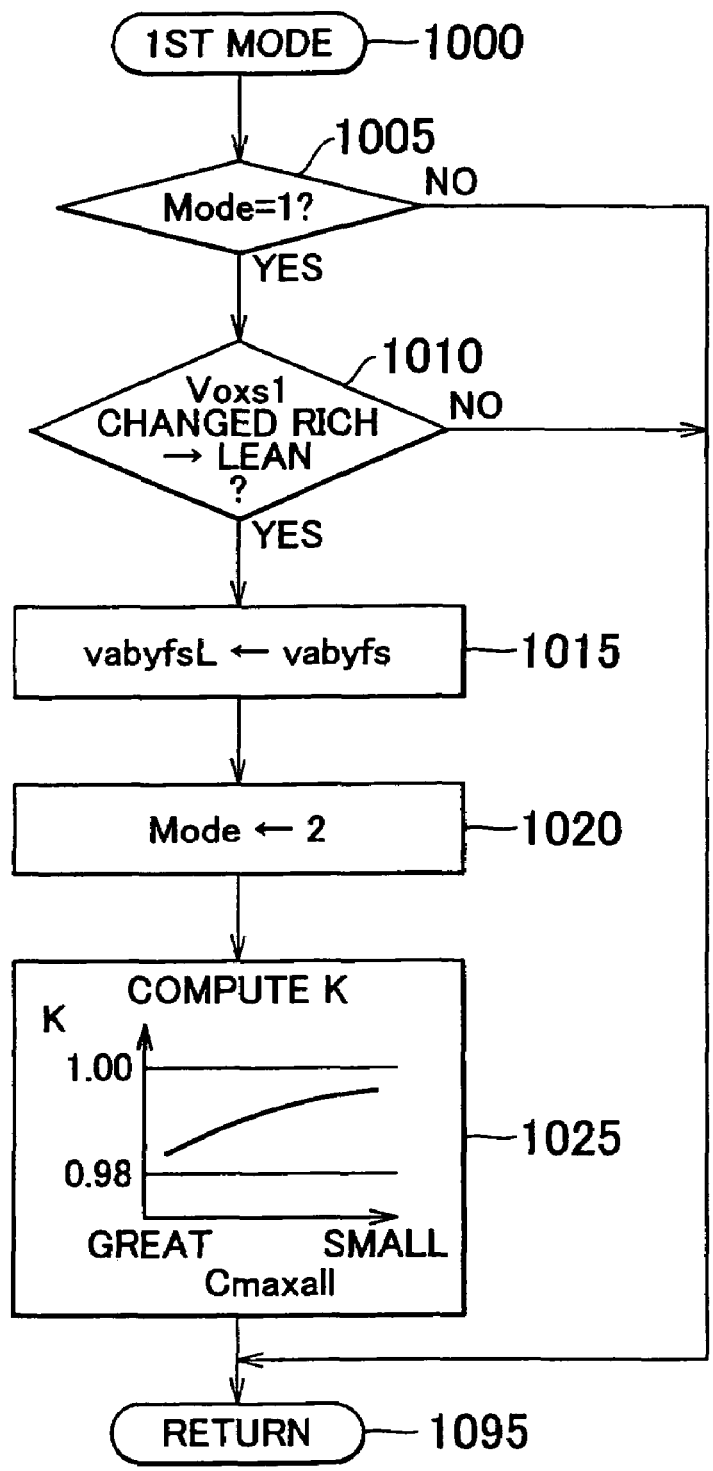
FIG. 10 is a flowchart illustrating a routine of a first mode executed by the CPU shown in FIG. 1.
Figure 11:
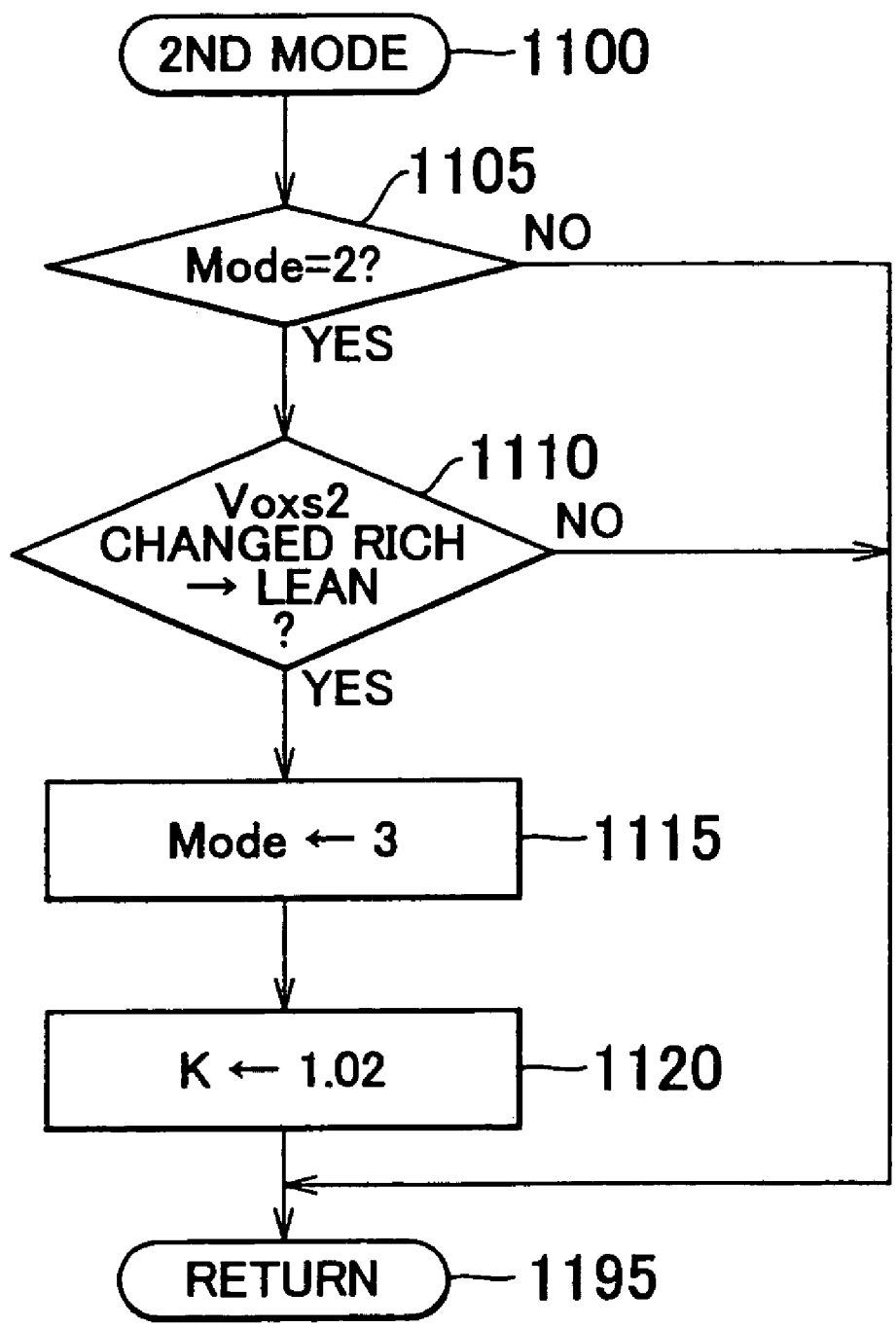
FIG. 11 is a flowchart illustrating a routine of a second mode executed by the CPU shown in FIG. 1.

In the mean time, the CPU 71 executes a first mode control routine illustrated in FIG. 10 at every elapse of a predetermined time. Therefore, when a predetermined timing is reached, the CPU 71 starts the routine at step S1000, and proceeds to step S1005, in which the CPU 71 determines whether the value of Mode "1". Since in this case, the value of Mode has been set at "1" in step S925 in FIG. 9, the CPU 71 makes a determination of "YES" in step S1005, and proceeds to step S1010. In step S1010, the CPU 71 determines whether the output Voxs1 of the downstream-of-first catalyst air-fuel ratio sensor has changed from a value indicating an air-fuel ratio rich of the stoichiometric air-fuel ratio to a value indicating an air-fuel ratio lean of the stoichiometric air-fuel ratio. Since at the present time point, the internal combustion engine air-fuel ratio has just been changed to the first lean air-fuel ratio, the output Voxs1 of the downstream-of-first catalyst air-fuel ratio sensor indicates an air-fuel ratio rich of the stoichiometric air-fuel ratio. Therefore, the CPU 71 makes a determination of "NO" in step S1010, and proceeds to step S1095, in which the CPU 71 temporarily ends the routine.

After that, the CPU 71 repeatedly executes steps S1000 to S1010 in FIG. 10. Since the air-fuel ratio is kept at the first lean air-fuel ratio, the downstream-of-first catalyst air-fuel ratio sensor output Voxs1 changes from the rich air-fuel ratio-indicating value to a lean air-fuel ratio-indicating value at the elapse of a predetermined time, as in the case of the time point t2 in FIG. 5. Therefore, when the CPU 71 proceeds to step S1010, the CPU 71 makes a determination of "YES". Then, the CPU 71 proceeds to step S1015, in which the CPU 71 stores the value of output vabyf of the upstream-most air-fuel ratio sensor 66 occurring at the present time point into the variable VabyfsL. Subsequently in step S1020, the CPU 71 sets the value of Mode at "2" so as to enter the second mode. Subsequently in step S1025, the CPU 71 computes and sets a value of the factor K on the basis of the below-described maximum oxygen storage amount Cmaxall of the entire catalyst device estimated in the previous catalyst degradation determination operation and a table indicated in the box of step S1025 in FIG. 10. Subsequently in step S1095, the CPU 71 temporarily ends the routine.

Therefore, the factor K is changed in accordance with the value of maximum oxygen storage amount Cmaxall of the entire catalyst device. That is, the factor K is set (relatively small) so as to approach 0.98 (i.e., the value of the factor K for achieving the first lean air-fuel ratio) as the value of maximum oxygen storage amount Cmaxall increases, and is set (relatively great) so as to approach 1.00 (i.e., the value of the factor K for achieving the stoichiometric air-fuel ratio) as the value of maximum oxygen storage amount Cmaxall decreases. That is, in step S1025, the factor K is set at an arbitrary value that is greater than 0.98 and is less than 1.00 in accordance with the value of the maximum oxygen storage amount Cmaxall of the entire catalyst device.

Therefore, due to the execution of step S610 in FIG. 6, the value obtained by multiplying the basic fuel injection amount Fbase by the factor K is calculated as a final fuel injection amount Fi. Since this final fuel injection amount Fi is injected, the internal combustion engine air-fuel ratio is controlled to the second lean air-fuel ratio that is lean of the stoichiometric air-fuel ratio and rich of the first lean air-fuel ratio, and that is changed in accordance with the value of the maximum oxygen storage amount Cmaxall of the entire catalyst device (approaches the stoichiometric air-fuel ratio as the maximum oxygen storage amount Cmaxall decreases).

When the second mode (Mode=2) is entered, the CPU 71 executes a similar mode control. Then, the CPU 71 sequentially changes the mode from the third mode to the fourth, fifth and sixth modes, and executes a control corresponding to each mode. Briefly, in the second mode whose routine is illustrated by a flowchart of FIG. 11, after starting in step S1100, in step S1105, the CPU 71 determines whether the value of Mode is "2". If the value of Mode is "2", the process proceeds from step S1105 to step S1110. In step S1110, the CPU 71 monitors whether the output Voxs2 of the downstream-of-second catalyst air-fuel ratio sensor 68 has changed from a value indicating an air-fuel ratio that is rich of the stoichiometric air-fuel ratio to a value indicating an air-fuel ratio that is lean of the stoichiometric air-fuel ratio.

If the output Voxs2 of the downstream-of-second catalyst air-fuel ratio sensor 68 changes from a value indicating an air-fuel ratio rich of the stoichiometric air-fuel ratio to a value indicating an air-fuel ratio lean of the stoichiometric air-fuel ratio as indicated at the time point t3 in FIG. 5, the CPU 71 proceeds to step S1115, in which the CPU 71 sets the value of Mode at "3" so as to enter the third mode. Subsequently in step S1120, the CPU 71 sets the value of the factor K at 1.02. As a result, the internal combustion engine air-fuel ratio is controlled to the first rich air-fuel ratio that is rich of the stoichiometric air-fuel ratio. The routine ends in step S1195.

Figure 12:
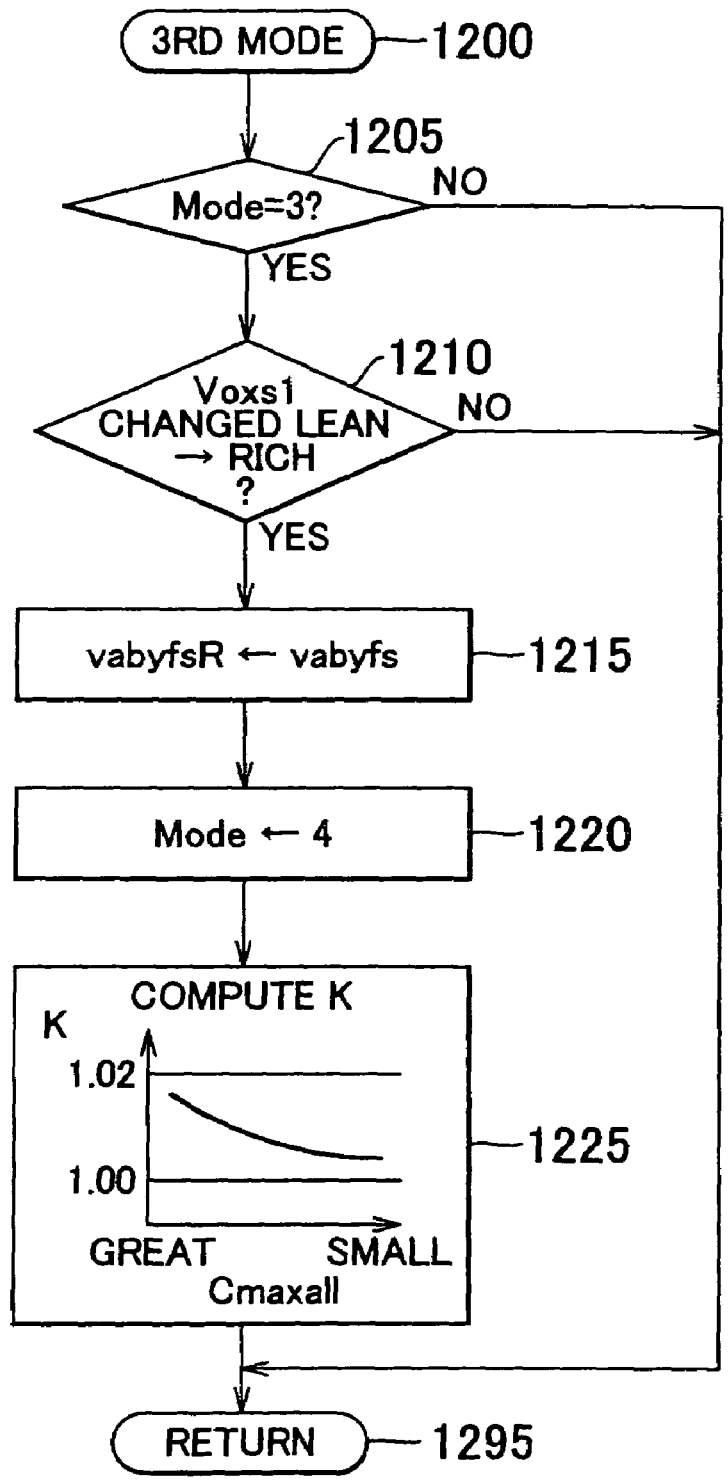
FIG. 12 is a flowchart illustrating a routine of a third mode executed by the CPU shown in FIG. 1.

Similarly, in the third mode whose routine is illustrated by the flowchart of FIG. 12, after starting in step S1200, the CPU 71 determines in step S1205 whether the value of Mode is "3". If the value of Mode is "3", the CPU 71 proceeds from step S1205 to step S1210. In step S1210, the CPU 71 monitors whether the output Voxs1 of the downstream-of-first catalyst air-fuel ratio sensor 67 has changed from a value indicating an air-fuel ratio that is lean of the stoichiometric air-fuel ratio to a value indicating an air-fuel ratio that is rich of the stoichiometric air-fuel ratio.

If the output Voxs1 of the downstream-of-first catalyst air-fuel ratio sensor 67 changes from a value indicating an air-fuel ratio lean of the stoichiometric air-fuel ratio to a value indicating an air-fuel ratio rich of the stoichiometric air-fuel ratio as indicated at the time point t4 in FIG. 5, the CPU 71 proceeds from step S1210 to step S1215. In step S1215, the CPU 71 stores the present value of output vabyfs of the upstream-most air-fuel ratio sensor 66 into the variable VabyfsR. Subsequently in step S1220, the CPU 71 sets the value of Mode at "4" so as to enter the fourth mode. Subsequently in step S1225, the CPU 71 calculates and sets a value of the factor K on the basis of the below-described maximum oxygen storage amount Cmaxall of the entire catalyst device estimated during the previous catalyst degradation determination and a table indicated in the box of step S1225 in FIG. 12. Subsequently in step S1295, the CPU 71 temporarily ends the routine.

Therefore, the factor K is changed in accordance with the value of maximum oxygen storage amount Cmaxall of the entire catalyst device. That is, the factor K is set (relatively great) so as to approach 1.02 (i.e., the value of the factor K for achieving the first rich air-fuel ratio) as the value of maximum oxygen storage amount Cmaxall increases, and is set (relatively small) so as to approach 1.00 (i.e., the value of the factor K for achieving the stoichiometric air-fuel ratio) as the value of maximum oxygen storage amount Cmaxall decreases. That is, in step S1225, the factor K is set at an arbitrary value that is greater than 1.00 and is less than 1.02 in accordance with the value of the maximum oxygen storage amount Cmaxall of the entire catalyst device. As a result, the internal combustion engine air-fuel ratio is controlled to the second rich air-fuel ratio that is rich of the stoichiometric and lean of the first rich air-fuel ratio, and that is changed in accordance with the value of the maximum oxygen storage amount Cmaxall of the entire catalyst device (approaches the stoichiometric air-fuel ratio as the maximum oxygen storage amount Cmaxall decreases).

Figure 13:
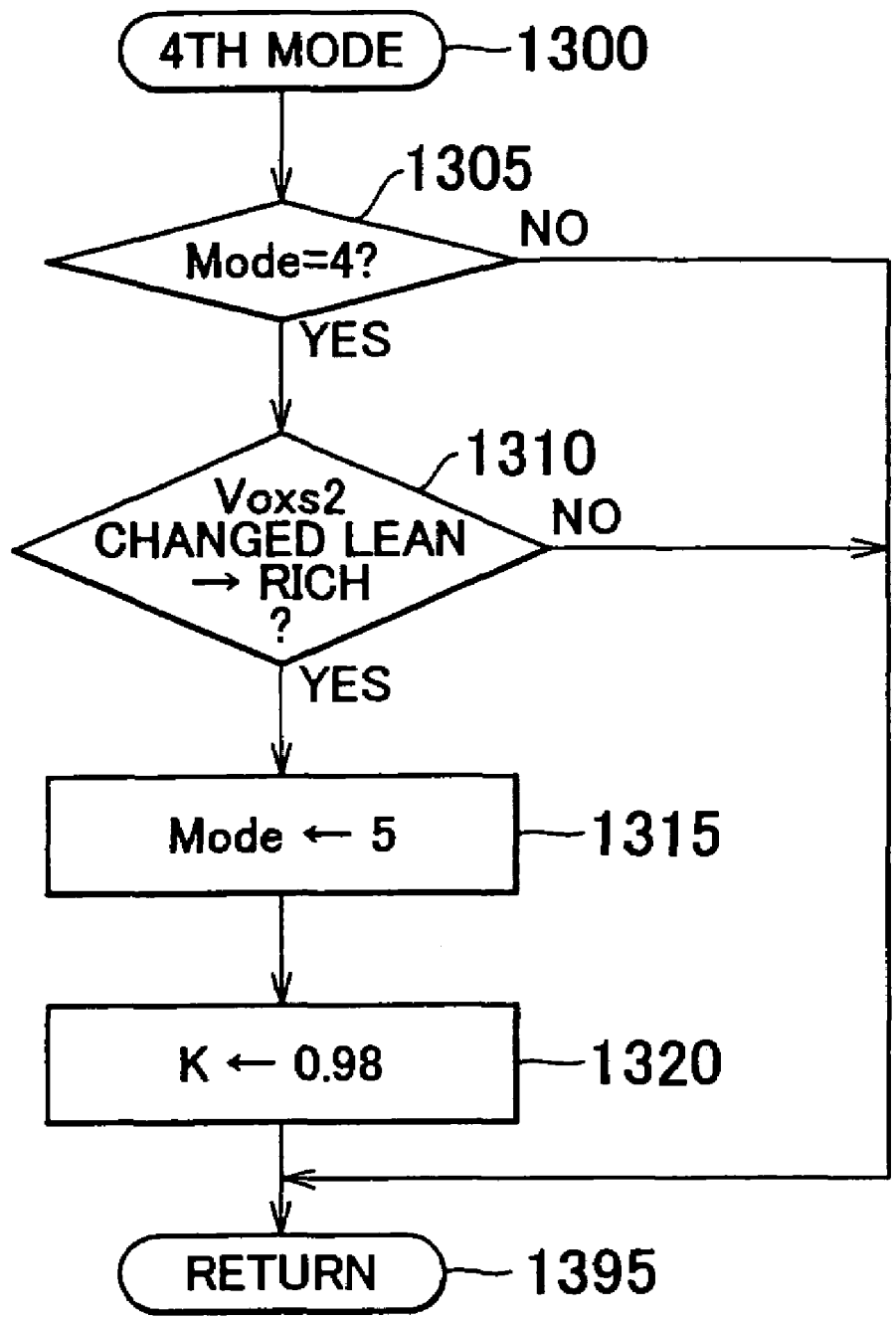
FIG. 13 is a flowchart illustrating a routine of a fourth mode executed by the CPU shown in FIG. 1.

Similarly, in the fourth mode whose routine is illustrated by the flowchart of FIG. 13, after starting in step S1300, the CPU 71 determines in step S1305 whether the value of Mode is "4". If the value of Mode is "4", the CPU 71 proceeds from step S1305 to step S1310. In step S1310, the CPU 71 monitors whether the output Voxs2 of the downstream-of-second catalyst air-fuel ratio sensor 68 has changed from a value indicating an air-fuel ratio that is lean of the stoichiometric air-fuel ratio to a value indicating an air-fuel ratio that is rich of the stoichiometric air-fuel ratio.

If the output Voxs2 of the downstream-of-second catalyst air-fuel ratio sensor 68 changes from a value indicating an air-fuel ratio lean of the stoichiometric air-fuel ratio to a value indicating an air-fuel ratio rich of the stoichiometric air-fuel ratio as indicated at the time point t5 in FIG. 5, the CPU 71 proceeds from step S1310 to step S1315. In step S1315, the CPU 71 sets the value of Mode at "5" so as to enter the fifth mode. Subsequently in step S1320, the CPU 71 sets the value of the factor K at 0.98. As a result, the internal combustion engine air-fuel ratio is controlled to the first lean air-fuel ratio. The routine ends in step S1395.

Figure 14:
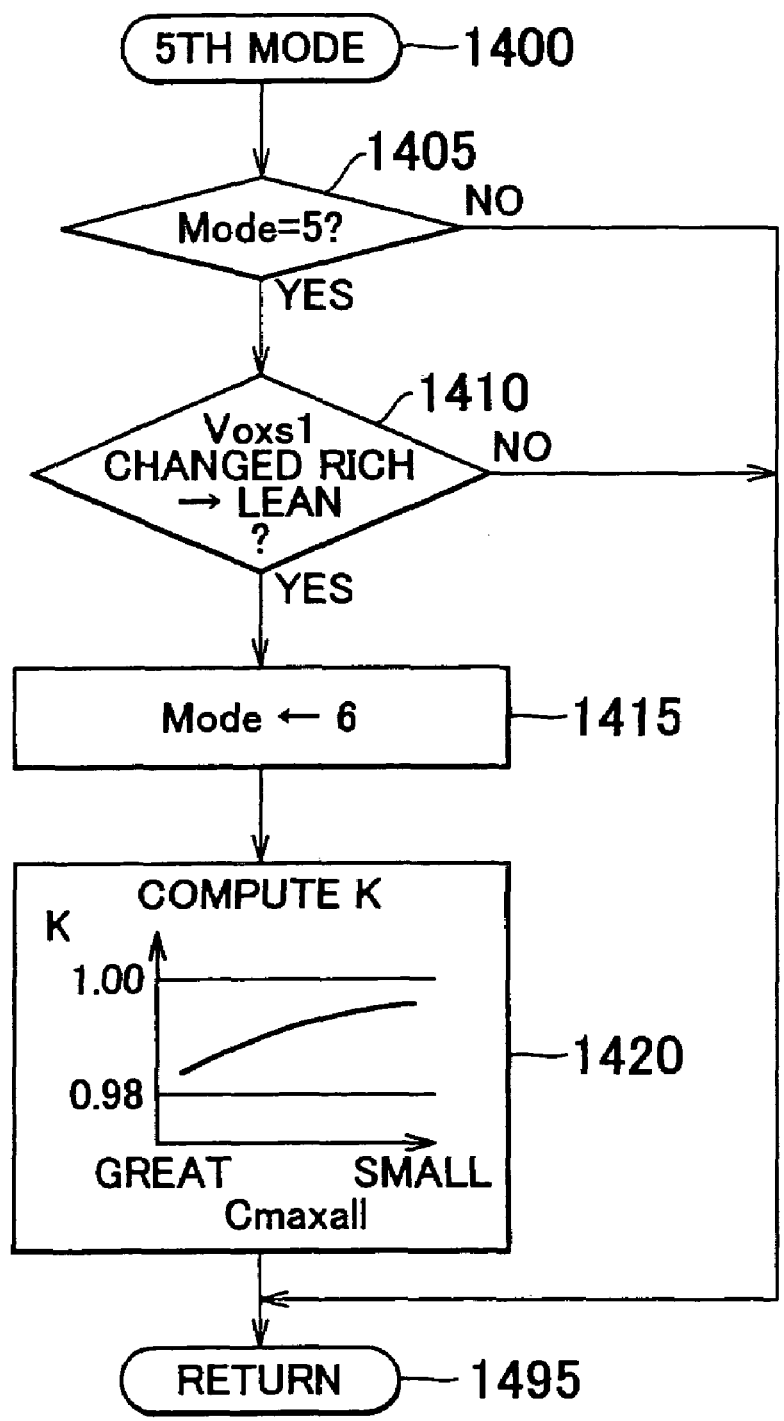
FIG. 14 is a flowchart illustrating a routine of a fifth mode executed by the CPU shown in FIG. 1.

Similarly, in the fifth mode whose routine is illustrated by the flowchart of FIG. 14, after starting in step S1400, the CPU 71 determines in step S1405 whether the value of Mode is "5". If the value of Mode is "5", the CPU 71 proceeds from step S1405 to step S1410. In step S1410, the CPU 71 monitors whether the output Voxs1 of the downstream-of-first catalyst air-fuel ratio sensor 67 has changed from a value indicating an air-fuel ratio that is rich of the stoichiometric air-fuel ratio to a value indicating an air-fuel ratio that is lean of the stoichiometric air-fuel ratio.

If the output Voxs1 of the downstream-of-first catalyst air-fuel ratio sensor 67 changes from a value indicating an air-fuel ratio rich of the stoichiometric air-fuel ratio to a value indicating an air-fuel ratio lean of the stoichiometric air-fuel ratio as indicated at the time point t6 in FIG. 5, the CPU 71 proceeds from step S1410 to step S1415. In step S1415, the CPU 71 sets the value of Mode at "6" so as to enter the sixth mode. Subsequently in step S1420, the CPU 71 calculates and sets a value of the factor K (0.98<K<1.00) on the basis of the below-described maximum oxygen storage amount Cmaxall of the entire catalyst device estimated during the previous catalyst degradation determination and a table indicated in the box of step S1420 that is the same as the aforementioned table indicated in the box of step S1025. As a result, the internal combustion engine air-fuel ratio is controlled to the second lean air-fuel ratio. The routine ends in step S1495.

Figure 15:
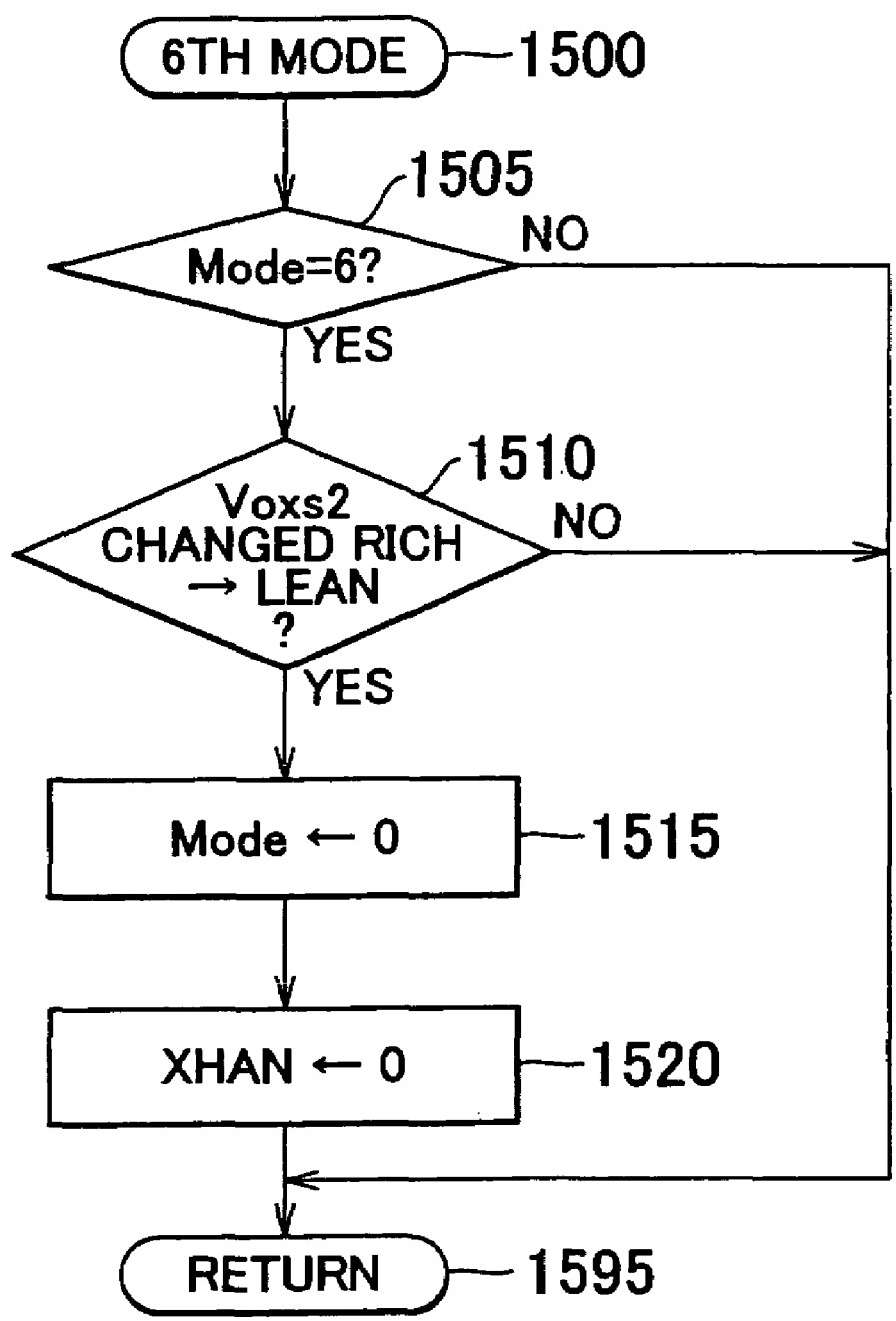
FIG. 15 is a flowchart illustrating a routine of a sixth mode executed by the CPU shown in FIG. 1.

Similarly, in the sixth mode whose routine is illustrated by the flowchart of FIG. 15, after starting in step S1500, the CPU 71 determines in step S1505 whether the value of Mode is "6". If the value of Mode is "6", the CPU 71 proceeds from step S1505 to step S1510. In step S1510, the CPU 71 monitors whether the output Voxs2 of the downstream-of-second catalyst air-fuel ratio sensor 68 has changed from a value indicating an air-fuel ratio that is rich of the stoichiometric air-fuel ratio to a value indicating an air-fuel ratio that is lean of the stoichiometric air-fuel ratio.

If the output Voxs2 of the downstream-of-second catalyst air-fuel ratio sensor 68 changes from a value indicating an air-fuel ratio rich of the stoichiometric air-fuel ratio to a value indicating an air-fuel ratio lean of the stoichiometric air-fuel ratio as indicated at the time point t7 in FIG. 5, the CPU 71 proceeds from step S1510 to step S1515. In step S1515, the CPU 71 sets the value of Mode at "0". Subsequently in step S1520, the CPU 71 sets the value of the catalyst degradation determination execution flag XHAN at "0". Then, in step S1595, the CPU 71 temporarily ends the routine. Therefore, when executing the routine of FIG. 9, the CPU 71 makes a determination of "YES" at step S905, and proceeds to step S910. Thus, the value of the factor K is returned to 1.00. Furthermore, if the other air-fuel ratio feedback control condition and the other subsidiary feedback control condition are fulfilled, the CPU 71 makes a determination of "YES" at step S705 and step S805, so that the air-fuel ratio feedback control and the subsidiary feedback control are started again.

As described above, if the catalyst degradation determining condition is fulfilled, the internal combustion engine air-fuel ratio is forcibly controlled to the first lean air-fuel ratio that is constant, the second lean air-fuel ratio that changes in accordance with the value of the maximum oxygen storage amount Cmaxall of the entire catalyst device estimated during the previous catalyst degradation determination operation (approaches the stoichiometric air-fuel ratio as the maximum oxygen storage amount Cmaxall decreases), the first rich air-fuel ratio that is constant, the second rich air-fuel ratio that changes in accordance with the value of the maximum oxygen storage amount Cmaxall of the entire catalyst device estimated during the previous catalyst degradation determination operation (approaches the stoichiometric air-fuel ratio as the maximum oxygen storage amount Cmaxall decreases), the first lean air-fuel ratio, and the second lean air-fuel ratio, in that order.

(Estimation of Oxygen Storage Amount, Determination Regarding Abnormality of Upstream-Most Air-Fuel Ratio Sensor, Catalyst Degradation Determination)

Next described will be operations for estimation of a maximum oxygen storage amount for determination regarding catalyst degradation, determination regarding abnormality of the upstream-most air-fuel ratio sensor 66, and determination regarding catalyst degradation based on the estimated maximum oxygen storage amount. The CPU 71 executes routines illustrated by the flowcharts of FIGS. 16 and 17 at every elapse of a predetermined time.

Figure 16:
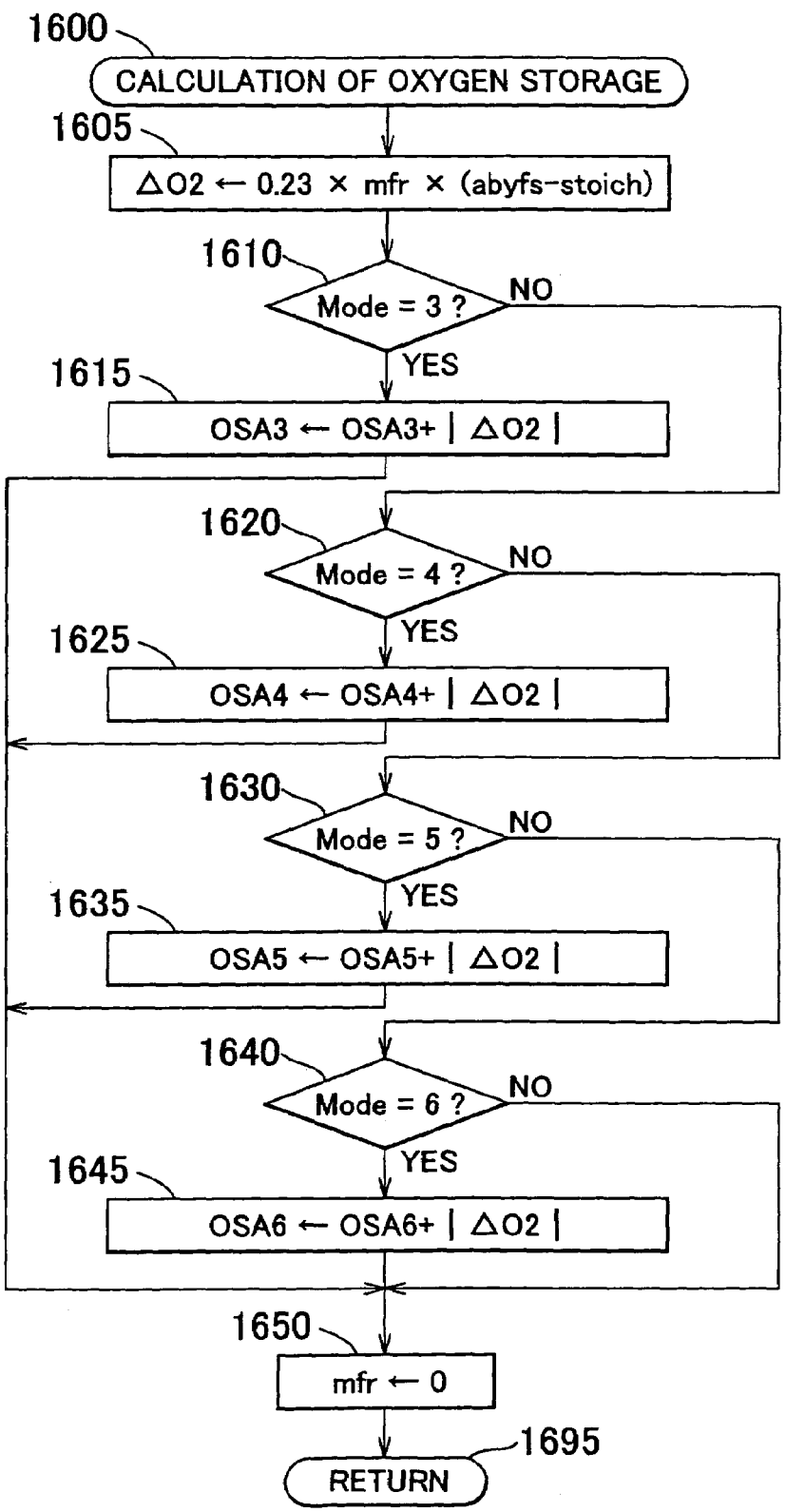
FIG. 16 is a flowchart illustrating a routine for calculating an oxygen storage amount executed by the CPU shown in FIG. 1.
Figure 17A:
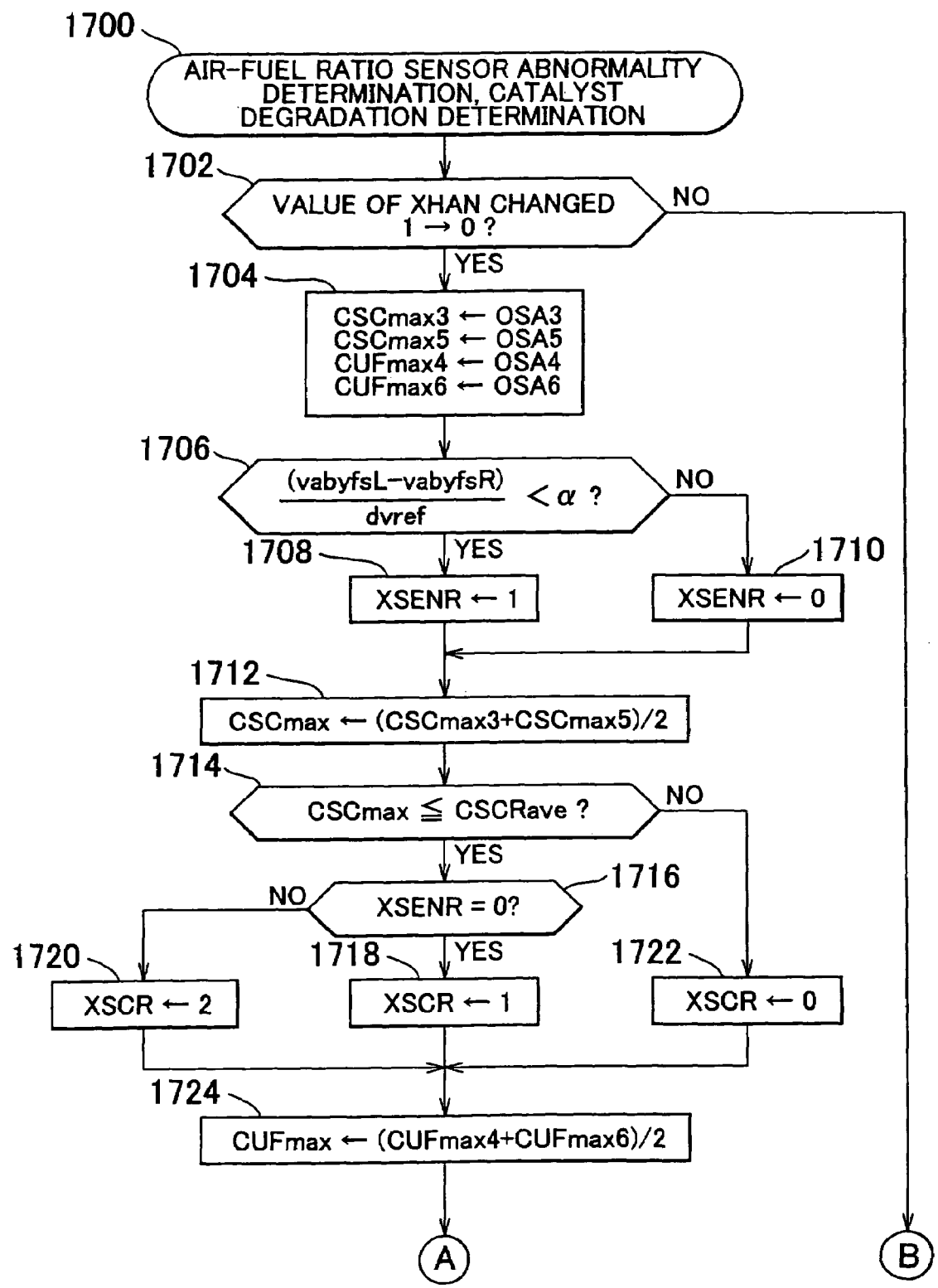
FIG. 17a and FIG. 17b are flowcharts illustrating a routine for determining whether the upstream-most air-fuel ratio sensor has an abnormality and determining whether a catalyst has degraded executed by the CPU shown in FIG. 1.
Figure 17B:
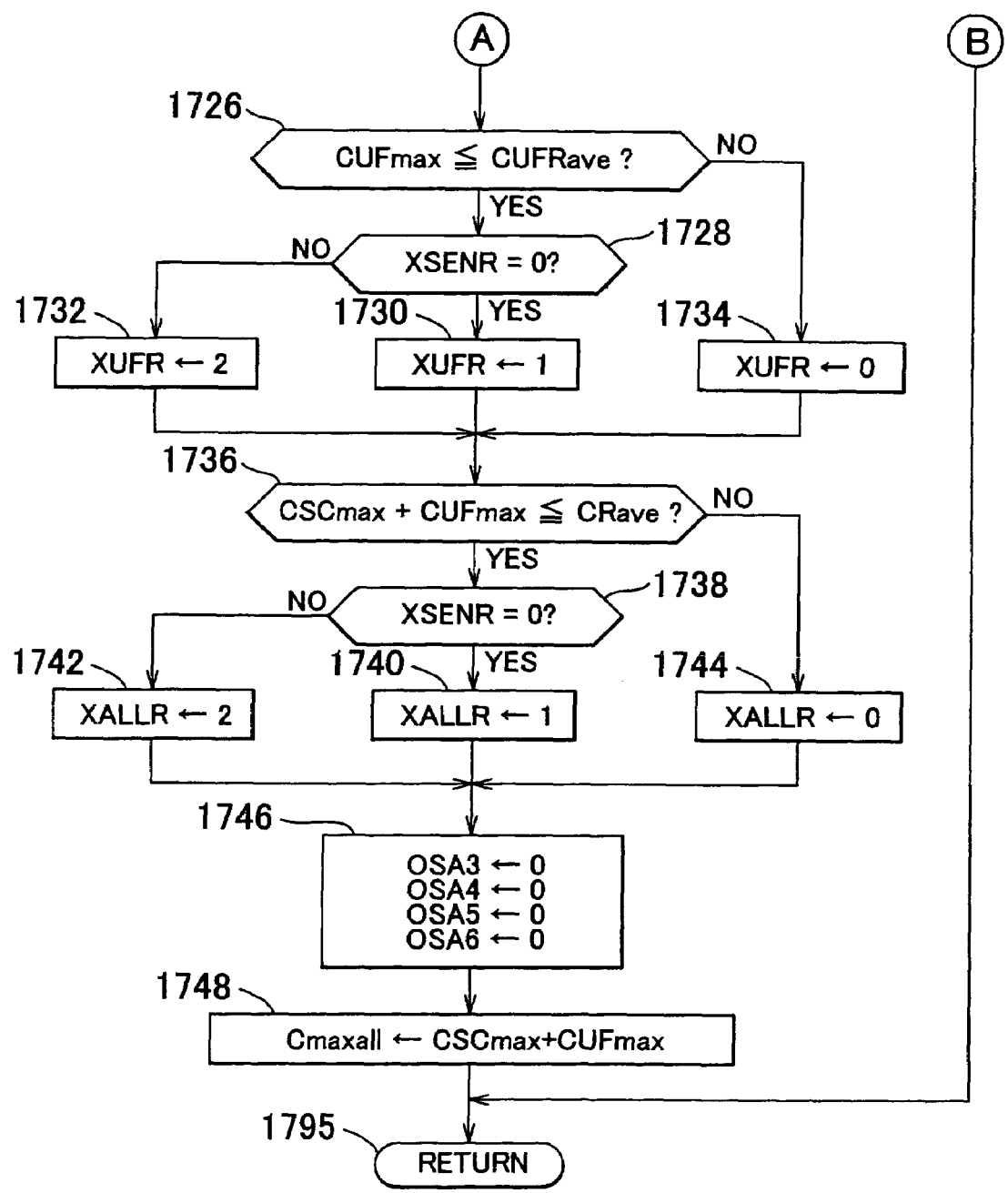

Therefore, when a predetermined timing is reached, the CPU 71 starts processing at step S1600 in FIG. 16, and proceeds to step S1605, in which the CPU 71 computes an amount of change ΔO2 in the oxygen storage amount as in mathematical expression 13.

$$\Delta O2 = 0.23 \times mfr \times (abyfs - stoich) \quad \text{[Expression 13]}$$

Subsequently in step S1610, the CPU 71 determines whether the value of Mode is "3". If the value of Mode is "3", the CPU 71 makes a determination of "YES" at step S1610, and proceeds to step S1615. In step S1615, the CPU 71 sets the value obtained by adding the absolute value of the amount of change ΔO2 in oxygen storage amount to the present value of the oxygen storage amount OSA3 of the third mode as a new oxygen storage amount OSA3. Then, the CPU 71 proceeds to step S1650. The reason for adding the absolute value of the amount of change ΔO2 in oxygen storage amount is that mathematical expression 13 provides a negative value of the amount of change ΔO2 in oxygen storage amount of the third mode, as is apparent from comparison between mathematical expression 13 and mathematical expression 1.

This process (step S1600 to step S1615) is repeatedly executed as long as the value of Mode is "3". As a result, during the third mode (Mode=3) where the air-fuel ratio of gas upstream of the first catalyst 53 is set at the first rich air-fuel ratio, the oxygen storage amount OSA3 of the first catalyst 53 is calculated. If the CPU 71 makes a determination of "NO" at step S1610, the CPU 71 immediately proceeds from step S1610 to step S1620.

If the CPU 71 proceeds to step S1620, the CPU 71 determines whether the value of Mode is "4". If the value of Mode is "4", the CPU 71 makes a determination of "YES" in step S1620, and proceeds to step S1625. In step S1625, the CPU 71 sets the value obtained by adding the absolute value of the amount of change ΔO2 in oxygen storage amount to the present oxygen storage amount OSA4 of the fourth mode as a new oxygen storage amount OSA4. Then, the CPU 71 proceeds to step S1650. The reason for adding the absolute value of the amount of change ΔO2 in oxygen storage amount is that mathematical expression 13 provides a negative value of the amount of change ΔO2 in the oxygen storage amount of the fourth mode as is apparent from comparison between mathematical expression 13 and mathematical expression 3.

The above-described process (steps S1600, 1605, 1610, 1620, 1625) is repeatedly executed as long as the value of Mode is "4". As a result, the oxygen storage amount OSA4 of the second catalyst 54 is calculated in the fourth mode (Mode=4) where the air-fuel ratio of gas upstream of the first catalyst 53 is set at the second rich air-fuel ratio. If the CPU 71 makes a determination of "NO" in step S1620, the CPU 71 immediately proceeds from step S1620 to step S1630.

Similarly, if the CPU 71 proceeds to step S1630, the CPU 71 determines whether the value of Mode is "5". If the value of Mode is "5", the CPU proceeds to step S1635. In step S1635, the CPU 71 sets the value obtained by adding the amount of change ΔO2 in oxygen storage amount to the present oxygen storage amount OSA5 of the fifth mode as a new oxygen storage amount OSA5. Then, the CPU 71 proceeds to step S1650.

The above-described process (steps S1600, 1605, 1610, 1620, 1630, 1635) is repeatedly executed as long as the value of Mode is "5". As a result, the oxygen storage amount OSA5 of the first catalyst 53 is calculated in the fifth mode (Mode=5) where the air-fuel ratio of gas upstream of the first catalyst 53 is set at the first lean air-fuel ratio. If the CPU 71 makes a determination of "NO" in step S1630, the CPU 71 immediately proceeds from step S1630 to step S1640.

Similarly, if the CPU 71 proceeds to step S1640, the CPU 71 determines whether the value of Mode is "6". If the value of Mode is "6", the CPU proceeds to step S1645. In step S1645, the CPU 71 sets the value obtained by adding the amount of change ΔO2 in oxygen storage amount to the present oxygen storage amount OSA6 of the sixth mode as a new oxygen storage amount OSA6. Then, the CPU 71 proceeds to step S1650.

The above-described process (steps S1600, 1605, 1610, 1620, 1630, 1640, 1645) is repeatedly executed as long as the value of Mode is "6". As a result, the oxygen storage amount OSA6 of the second catalyst 54 is calculated in the sixth mode (Mode=6) where the air-fuel ratio of gas upstream of the first catalyst 53 is set at the second lean air-fuel ratio. If the CPU 71 makes a determination of "NO" in step S1640, the CPU 71 immediately proceeds from step S1640 to step S1650.

When the CPU 71 proceeds to step S1650, the CPU 71 sets the total amount mfr of the fuel injection amount Fi at "0" in step S1650. Subsequently in step S1695, the CPU 71 temporarily ends the routine.

Furthermore, the CPU 71 executes a routine for determination regarding abnormality of the upstream-most air-fuel ratio sensor 66 and determination regarding catalyst degradation at every elapse of a predetermined time. Therefore, when a predetermined timing is reached, the CPU 71 starts processing at step S1700, and proceeds to step S1702, in which the CPU 71 determines whether the value of the catalyst degradation determination execution flag XHAN has changed from "1" to "0". If at this time, the sixth mode ends and the value of the catalyst degradation determination execution flag XHAN is changed to "0" in step S1520 in FIG. 15, the CPU 71 makes a determination of "YES" in step S1702, and proceeds to step S1704. Conversely, if the value of the catalyst degradation determination execution flag XHAN has not changed, the CPU 71 immediately proceeds from step S1702 to step S1795, in which the CPU 71 temporarily ends the routine.

If it is assumed that the sixth mode has just ended, the value of the catalyst degradation determination execution flag XHAN has just been changed from "1" to "0", and therefore, the CPU 71 proceeds from step S1702 to step S1704, in which the present oxygen storage amounts OSA3, OSA4, OSA5, OSA6 are stored as maximum oxygen storage amounts CSCmax3 (the first maximum oxygen storage amount of the first catalyst), CUFmax4 (the first maximum oxygen storage amount of the second catalyst), CSCmax5 (the second maximum oxygen storage amount of the first catalyst), and CUFmax6 (the second maximum oxygen storage amount of the second catalyst).

Subsequently in step S1706, on the basis of the value of variable VabyfsL, the value of variable VabyfsR, and mathematical expression 9 (mathematical expression shown in the box of step S1706), the CPU 71 determines whether the ratio ((vabyfsL−vabyfsR)/dvref) of the value of deviation (vabyfsL−vabyfsR) to the value of deviation dvref is less than α criterion a for determination regarding degradation of the upstream-most air-fuel ratio sensor. If the ratio ((vabyfsL−vabyfsR)/dvref) is less than the upstream-most air-fuel ratio sensor degradation criterion α, the CPU 71 proceeds to step S1708 and sets the value of an upstream-most air-fuel ratio sensor abnormality determination result flag XSENR at "1", thereby indicating that the upstream-most air-fuel ratio sensor 66 is abnormal (degraded). It is to be noted herein that step S1706 functions as an upstream-of-catalyst air-fuel ratio sensor abnormality detecting means.

Conversely, if it is determined in step S1706 that the ratio ((vabyfsL−vabyfsR)/dvref) is greater than or equal to the upstream-most air-fuel ratio sensor degradation criterion α, the CPU 71 proceeds to step S1710. In step S1710, the CPU 71 sets the value of the upstream-most air-fuel ratio sensor abnormality flag XSENR to "0", thereby indicating that the upstream-most air-fuel ratio sensor 66 is normal (not degraded).

Subsequently in step S1712, the CPU 71 stores a mean value of the maximum oxygen storage amount CSCmax3 and the maximum oxygen storage amount CSCmax5 as a mean maximum oxygen storage amount CSCmax of the first catalyst 53.

Subsequently in step S1714, the CPU 71 determines whether the mean maximum oxygen storage amount CSCmax is less than or equal to the first catalyst degradation criterion CSCRave. If the mean maximum oxygen storage amount CSCmax is less than or equal to the first catalyst degradation criterion CSCRave, the CPU 71 proceeds to step S1716, in which the CPU 71 determines whether the value of the upstream-most air-fuel ratio sensor abnormality flag XSENR is "0".

If it is determined in step S1716 that the value of the upstream-most air-fuel ratio sensor abnormality flag XSENR is "0", the CPU 71 sets the value of a first catalyst degradation determination result flag XSCR to "1" in step S1718, thereby indicating that the first catalyst 53 has degraded. Conversely, if it is determined in step S1716 that the value of the upstream-most air-fuel ratio sensor abnormality flag XSENR is not "0" (i.e., if the value is "1"), the CPU 71 sets the value of the first catalyst degradation determination result flag XSCR at "2" in step S1720, thereby indicating that determination regarding degradation of the first catalyst 53 has not been made.

If it is determined in step S1714 that the mean maximum oxygen storage amount CSCmax is greater than the first catalyst degradation criterion CSCRave, the CPU 71 sets the value of the first catalyst degradation determination result flag XSCR at "0", thereby indicating that the first catalyst 53 has not degraded.

In this manner, if the mean maximum oxygen storage amount CSCmax is less than or equal to the first catalyst degradation criterion CSCRave (i.e., if the first catalyst 53 is in a state where it should be determined that the first catalyst 53 has degraded), the CPU 71 determines that the first catalyst 53 has degraded provided that no abnormality of the upstream-most air-fuel ratio sensor 66 is detected. If an abnormality of the upstream-most air-fuel ratio sensor 66 has been detected in that case, the CPU 71 avoids determining that the first catalyst 53 has degraded. If the mean maximum oxygen storage amount CSCmax is greater than the first catalyst degradation criterion CSCRave (i.e., if the first catalyst 53 is in a state where it should be determined that the first catalyst 53 has not degraded), the CPU 71 determines that the first catalyst 53 has not degraded, regardless of whether an abnormality of the upstream-most air-fuel ratio sensor 66 has been detected.

Subsequently, the CPU 71 proceeds to step S1724, in which the CPU 71 stores the mean value of the maximum oxygen storage amount CUFmax4 and the maximum oxygen storage amount CUFmax6 as a mean maximum oxygen storage amount CUFmax of the second catalyst 54. Subsequently in step S1726, the CPU 71 determines whether the mean maximum oxygen storage amount CUFmax is less than or equal to the second catalyst degradation criterion CUFRave. If the mean maximum oxygen storage amount CUFmax is less than or equal to the second catalyst degradation criterion CUFRave, the CPU 71 proceeds to step S1728, in which the CPU 71 determines whether the value of the upstream-most air-fuel ratio sensor abnormality flag XSENR is "0".

If it is determined in step S1728 that the value of the upstream-most air-fuel ratio sensor abnormality flag XSENR is "0", the CPU 71 sets the value of a second catalyst degradation determination result flag XUFR at "1" in step S1730, thereby indicating that the second catalyst 54 has degraded. Conversely, if it is determined in step S1728 that the value of the upstream-most air-fuel ratio sensor abnormality determination result flag XSENR is not "0" (i.e., if the value is "1"), the CPU 71 sets the value of the second catalyst degradation determination result flag XUFR at "2" in step S1732, thereby indicating that the determination regarding degradation of the second catalyst 54 has not been performed.

If it is determined in step S1726 that the mean maximum oxygen storage amount CUFmax is greater than the second catalyst degradation criterion CUFRave, the CPU 71 sets the value of the second catalyst degradation determination result flag XUFR at "0" in step S1734, thereby indicating that the second catalyst 54 has not degraded.

In this manner, if the mean maximum oxygen storage amount CUFmax is less than or equal to the second catalyst degradation criterion CUFRave (if the second catalyst 54 is a state where it should be determined that the second catalyst 54 has degraded), the CPU 71 determines that the second catalyst 54 has degraded provided that no abnormality of the upstream-most air-fuel ratio sensor 66 is detected. If an abnormality of the upstream-most air-fuel ratio sensor 66 has been detected in that case, the CPU 71 avoids determining that the second catalyst 54 has degraded. If the mean maximum oxygen storage amount CUFmax is greater than the second catalyst degradation criterion CUFRave (i.e., if the second catalyst 54 is in a state where it should be determined that the second catalyst 54 has not degraded), the CPU 71 determines that the second catalyst 54 has not degraded, regardless of whether an abnormality of the upstream-most air-fuel ratio sensor 66 has been detected.

Subsequently, the CPU 71 proceeds to step S1736, in which the CPU 71 determines whether the sum of the mean maximum oxygen storage amount CSCmax, that is, a value regarding the maximum oxygen storage amount of the first catalyst 53, and the mean maximum oxygen storage amount CUFmax, that is, a value regarding the maximum oxygen storage amount of the second catalyst 54, is less than or equal to the entire catalyst degradation criterion CRave. If the aforementioned sum is less than or equal to the entire catalyst degradation criterion CRave, the CPU 71 proceeds to step S1738, in which the CPU 71 determines whether the value of the upstream-most air-fuel ratio sensor abnormality determination result flag XSENR is "0".

If it is determined in step S1738 that the value of the upstream-most air-fuel ratio sensor abnormality determination result flag XSENR is "0", the CPU 71 sets the value of an entire catalyst degradation determination result flag XALLR at "1" in step S1740, thereby indicating that the combination of the first catalyst 53 and the second catalyst 54 has degraded as a whole. Conversely, if it is determined in step S1738 that the value of the upstream-most air-fuel ratio sensor abnormality determination result flag XSENR is not "0" (i.e., if the value is "1"), the CPU 71 sets the value of the entire catalyst degradation determination result flag XALLR at "2" in step S1742, thereby indicating that determination regarding degradation of the first catalyst 53 and the second catalyst 54 combined has not been performed.

Conversely, if it is determined in step S1736 that the aforementioned sum is greater than the entire catalyst degradation criterion CRave, the CPU 71 sets the value of the entire catalyst degradation determination result flag XALLR at "0" in step S1744, thereby indicating that the entire device of the first catalyst 53 and the second catalyst 54 has not degraded.

In this manner, if the aforementioned sum is less than or equal to the entire catalyst degradation criterion CRave (i.e., if the first catalyst 53 and the second catalyst 54 are in a state where it should be determined that the entire device of the first and second catalysts 53, 54 has degraded), the CPU 71 determines that the entire device of the first catalyst 53 and the second catalyst 54 has degraded provided that no abnormality of the upstream-most air-fuel ratio sensor 66 has been detected. If an abnormality of the upstream-most air-fuel ratio sensor 66 has been detected, the CPU 71 avoids determining that the entire device of the first and second catalysts 53, 54 has degraded. If the aforementioned sum is greater than the entire catalyst degradation criterion CRave (i.e., if the first catalyst 53 and the second catalyst 54 are in a state where it should be determined that the entire device of the first and second catalysts 53, 54 has not degraded), the CPU 71 determines that the first catalyst 53 and the second catalyst 54 have not degraded as a whole, regardless of whether an abnormality of the upstream-most air-fuel ratio sensor 66 has been detected.

Subsequently, the CPU 71 proceeds to step S1746, in which the CPU 71 sets all the values of the oxygen storage amounts OSA3, OSA4, OSA5, OSA6 at "0". Subsequently in step S1748, the CPU 71 stores the sum of the mean maximum oxygen storage amount SCSmax and the mean maximum oxygen storage amount CUFmax as a maximum oxygen storage amount Cmaxall of the entire catalyst device into the backup RAM 74. Subsequently in step S1795, the CPU 71 temporarily ends the routine.

As described above, according to the catalyst degradation determining method of the catalyst degradation determining apparatus of the invention, the downstream-of-first catalyst air-fuel ratio sensor 67 and the downstream-of-second catalyst air-fuel ratio sensor 68 are disposed downstream of the first catalyst 53 and the second catalyst 54, respectively. Therefore, it is possible to reliably detect the time when the amount of oxygen stored in either one of the catalysts reaches "0" or the maximum oxygen storage amount. As a result, the maximum oxygen storage amount CSCmax of the first catalyst 53 and the maximum oxygen storage amount CUFmax of the second catalyst 54 can be determined with good precision. Therefore, it is possible to determine whether the first catalyst 53 has degraded and whether the second catalyst 54 has degraded, separately, with good precision. The first catalyst 53 and the second catalyst 54 can be viewed as a single catalyst device. The method allows determination as to whether the entire catalyst device has degraded.

During execution of the determination regarding catalyst degradation, the second lean air-fuel ratio is changed in accordance with the value of the entire catalyst oxygen storage amount Cmaxall estimated during the previous determination regarding catalyst degradation, and is set so as to always equal an air-fuel ratio that is near the upper limit value of the window range of the catalyst device occurring at the present time (see time t2 to t3, and time t6 to t7 in FIG. 5).

The reason for setting the second lean air-fuel ratio at an air-fuel ratio that is near the present upper limit value of the window range of the catalyst device is as follows. That is, when the output Voxs2 of the downstream-of-second catalyst air-fuel ratio sensor 68 changes from a value indicating an air-fuel ratio rich of the stoichiometric air-fuel ratio to a value indicating an air-fuel ratio lean of the stoichiometric air-fuel ratio (see time points t3, t7 in FIG. 5) as a mixture of the second lean air-fuel ratio flows into the first and second catalysts 53, 54, the gas of the second lean air-fuel ratio fills a space defined by the catalysts 53, 54 and the exhaust passages 51, 52 extending from the exhaust port 34 of the engine 10 to the downstream-of-second catalyst air-fuel ratio sensor 68. At that time, the oxygen storage amounts of the first and second catalysts 53, 54 have reached the maximum oxygen storage amounts CSCmax, CUFmax. Therefore, the oxygen storing functions of the first and second catalysts 53, 54 are not effective, so that nitrogen oxides NOx are likely to be emitted.

Therefore, if the second lean air-fuel ratio is a lean air-fuel ratio that is considerably higher than the upper limit value of the window range of the catalyst device, a large amount of nitrogen oxides NOx will be contained in the gas contained in the aforementioned space. Besides, the oxygen storing functions of the first and second catalysts 53, 54 are not effective, and the efficiency of removal of nitrogen oxides NOx based on the reducing functions of the first and second catalysts 53, 54 has become low. Therefore, a large amount of nitrogen oxides NOx will be released into the atmosphere immediately after the time of a lean-side switch of the output of the downstream-of-second catalyst air-fuel ratio sensor (see time points t3, t7 in FIG. 5).

In contrast, if the second lean air-fuel ratio is always kept at an air-fuel ratio that is near the present upper limit value of the window range of the catalyst device as in the foregoing embodiments, the efficiency of removal of nitrogen oxides NOx based on the reducing function of the catalyst device immediately after the time of a lean-side switch of the output of the downstream-of-second catalyst air-fuel ratio sensor is kept at or above a predetermined high value, and the amount of nitrogen oxides NOx emitted immediately after the aforementioned switch can be minimized. Furthermore, since the second lean air-fuel ratio is set at an air-fuel ratio that is as remote from the stoichiometric air-fuel ratio as possible, the length of time (time t2 to t3 and time t6 to t7 in FIG. 5) needed to bring the oxygen storage amount of the second catalyst 54 to the maximum oxygen storage amount can be reduced, in comparison with the case where the second lean air-fuel ratio is pre-set at a lean air-fuel ratio close to the stoichiometric air-fuel ratio. The time (time t1 to t7 in FIG. 5) needed for calculation of the maximum oxygen storage amount can also be shortened.

Still further, the first lean air-fuel ratio is set at an air-fuel ratio that is on the leaner side of the second lean air-fuel ratio (an air-fuel ratio slightly above the upper limit value of the window range the catalyst device in a brand-new condition) (see time t1 to t2 and time t5 to t6 in FIG. 5). The reason for setting the first lean air-fuel ratio at an air-fuel ratio that is lean of the second lean air-fuel ratio is as follows.

That is, during the period during which the air-fuel ratio of gas upstream of the first catalyst is controlled to the first lean air-fuel ratio, the amount of oxygen stored in the first catalyst 53 does not reach the oxygen storage amount CSCmax prior to the end of the period although the oxygen storage amount increases with elapse of time. Until the end of the period, that is, the time point at which the output of the downstream-of-first catalyst air-fuel ratio sensor 67 comes to indicate an air-fuel ratio lean of the stoichiometric air-fuel ratio, a lean air-fuel ratio gas does not start to flow out of the first catalyst 53, and therefore, the oxygen storage amount of the second catalyst 54 remains at "0".

Therefore, even if the first lean air-fuel ratio is set at an air-fuel ratio that is higher by a certain amount than the upper limit value of the window range of the catalyst device, nitrogen oxides that flow into the first catalyst 53 are removed due to the oxygen storing function of the first and second catalysts 53, 54 and therefore are not emitted into the atmosphere during a period during which the air-fuel ratio of gas upstream of the first catalyst is controlled to the first lean air-fuel ratio. Therefore, if the first lean air-fuel ratio is set at an air-fuel ratio that is lean of the second lean air-fuel ratio as in the foregoing embodiments, the length of time (time t1 to t2, and time t5 to t6 in FIG. 5) needed to bring the amount of oxygen stored in the first catalyst 53 to the maximum oxygen storage amount can be reduced, in comparison with the case where the first lean air-fuel ratio is set equal to the second lean air-fuel ratio. The time (time t1 to t7 in FIG. 5) needed for calculation of the maximum oxygen storage amount can be further shortened.

Similarly, during an execution of the determination regarding catalyst degradation, the second rich air-fuel ratio is changed in accordance with the value of the maximum oxygen storage amount Cmaxall of the entire catalyst estimated during the previous execution of the determination regarding catalyst degradation, so that the second rich air-fuel ratio is always at an air-fuel ratio that is close to the present lower limit value of the window range of the catalyst device (see time t4 to t5 in FIG. 5).

The reason for always setting the second rich air-fuel ratio at an air-fuel ratio close to the present lower limit value of the window range of the catalyst device is as follows. That is, when the output Voxs2 of the downstream-of-second catalyst air-fuel ratio sensor 68 changes from a value indicating an air-fuel ratio lean of the stoichiometric air-fuel ratio to a value indicating an air-fuel ratio rich of the stoichiometric air-fuel ratio (see time point t5 in FIG. 5) as a mixture of the second rich air-fuel ratio flows into the first and second catalysts 53, 54, the gas of the second rich air-fuel ratio fills a space defined by the catalysts 53, 54 and the exhaust passages 51, 52 extending from the exhaust port 34 of the engine 10 to the downstream-of-second catalyst air-fuel ratio sensor 68. At that time, the amounts of oxygen stored in the first and second catalysts 53, 54 are both "0", and therefore the oxygen releasing functions of the first and second catalysts 53, 54 are not effective, so that unburned components, such as CO, HC, etc., are likely to be emitted.

Therefore, if the second rich air-fuel ratio is a rich air-fuel ratio that is considerably lower than the lower limit value of the window range of the catalyst device, a large amount of CO and HC will be contained in the gas contained in the aforementioned space. Besides, the oxygen releasing functions of the first and second catalysts 53, 54 are not effective, and the efficiency of removal of CO and HC based on the oxidizing functions of the first and second catalysts 53, 54 has become low. Therefore, a large amount of CO and HC will be released into the atmosphere immediately after the time of a rich-side switch of the output of the downstream-of-second catalyst air-fuel ratio sensor (see time point t5 in FIG. 5).

In contrast, if the second rich air-fuel ratio is always kept at an air-fuel ratio that is near the present lower limit value of the window range of the catalyst device as in the foregoing embodiments, the efficiency of removal of CO and HC based on the oxidizing function of the catalyst device immediately after the time of a rich-side switch of the output of the downstream-of-second catalyst air-fuel ratio sensor is kept at or above a predetermined high efficiency value, and the amount of CO and HC emitted immediately after the aforementioned switch can be minimized. Furthermore, since the second rich air-fuel ratio is set at an air-fuel ratio that is as remote from the stoichiometric air-fuel ratio as possible, the length of time (time t4 to t5 in FIG. 5) needed to consume the amount of oxygen stored in the second catalyst 54 to the level of "0" can be reduced, in comparison with the case where the second rich air-fuel ratio is pre-set at an air-fuel ratio close to the stoichiometric air-fuel ratio. The time (time t1 to t7 in FIG. 5) needed for calculation of the maximum oxygen storage amount can also be shortened.

Furthermore, the first rich air-fuel ratio is set at an air-fuel ratio that is on the richer side of the second rich air-fuel ratio (an air-fuel ratio slightly below the lower limit value of the window range the catalyst device in a brand-new condition) (see time t3 to t4 in FIG. 5). The reason for setting the first rich air-fuel ratio at an air-fuel ratio that is rich of the second rich air-fuel ratio is as follows.

That is, during the period during which the air-fuel ratio of gas upstream of the first catalyst is controlled to the first rich air-fuel ratio, the amount of oxygen stored in the first catalyst 53 does not reach "0" prior to the end of the period although the oxygen storage amount decreases with elapse of time. Until the end of the period, that is, the time point at which the output of the downstream-of-first catalyst air-fuel ratio sensor 67 comes to indicate an air-fuel ratio rich of the stoichiometric air-fuel ratio, a rich air-fuel ratio gas does not start to flow out of the first catalyst 53, and therefore, the oxygen storage amount of the second catalyst 54 remains at the maximum oxygen storage amount CUFmax.

Therefore, even if the first rich air-fuel ratio is set at an air-fuel ratio that is lower by a certain amount than the lower limit value of the window range of the catalyst device, CO and HC that flow into the first catalyst 53 are removed due to the oxygen releasing functions of the first and second catalysts 53, 54 and therefore are not emitted into the atmosphere during a period during which the air-fuel ratio of gas upstream of the first catalyst is controlled to the first rich air-fuel ratio. Therefore, if the first rich air-fuel ratio is set at an air-fuel ratio that is on the richer side of the second rich air-fuel ratio as in the foregoing embodiments, the length of time (time t3 to t4 in FIG. 5) needed to consume the amount of oxygen stored in the first catalyst 53 to the level of "0" can be reduced, in comparison with the case where the first rich air-fuel ratio is set equal to the second rich air-fuel ratio. The time (time t1 to t7 in FIG. 5) needed for calculation of the maximum oxygen storage amount can be further shortened.

Even in a case where degradation of the upstream-most air-fuel ratio sensor 66 has progressed and an abnormality of the upstream-most air-fuel ratio sensor 66 has been detected, it is possible to determine that neither one of the first and second catalysts 53, 54 has degraded and that the catalyst device has not degraded. As long as it is determined that each catalyst has not degraded, there is no need to replace the upstream-most air-fuel ratio sensor 66. Thus, the time of replacing the upstream-most air-fuel ratio sensor 66 can be delayed. Furthermore, as long as an abnormality of the upstream-most air-fuel ratio sensor 66 is detected, determination that a catalyst has degraded is avoided. Thus, a false determination regarding degradation of each catalyst can be prevented.

The invention is not limited to the foregoing embodiments, but may be modified in various manners within the scope of the invention. For example, although in the foregoing embodiments, the first rich air-fuel ratio, the second rich air-fuel ratio, the first lean air-fuel ratio and the second lean air-fuel ratio are constant during the corresponding modes, the air-fuel ratios may be variable.

Furthermore, in the foregoing embodiments, the second lean air-fuel ratio and the second rich air-fuel ratio are changed in accordance with the value of the maximum oxygen storage amount Cmaxall of the entire catalyst estimated during the previous execution of the determination regarding catalyst degradation, that is, a degradation index. As for such a degradation index, however, it is possible to adopt the value of the maximum oxygen storage amount CSCmax of the first catalyst 53, the value of the maximum oxygen storage amount CUFmax of the second catalyst 54, or a value obtained by weighting the value of the maximum oxygen storage amount CSCmax of the first catalyst 53 and the value of the maximum oxygen storage amount CUFmax of the second catalyst 54 in a predetermined weighting fashion, and summing the weighted values, so that the second lean air-fuel ratio and the second rich air-fuel ratio may be changed in accordance with such an index value.

For example, if the value of the maximum oxygen storage amount CUFmax of the second catalyst 54 is adopted as a degradation index, it is possible to set the second lean air-fuel ratio at an air-fuel ratio close to the present upper limit value of the window range of the second catalyst 54, the window range narrowing in accordance with the degree of degradation of the second catalyst 54, and set the second rich air-fuel ratio at an air-fuel ratio close to the present lower limit value of the window range of the second catalyst 54, and set the first lean air-fuel ratio at an air-fuel ratio slightly above the upper limit value of the window range of the second catalyst 54 in a brand new condition, and set the first rich air-fuel ratio at an air-fuel ratio slightly below the lower limit value of the window range of the second catalyst 54 in the brand new condition.

Still further, in the foregoing embodiments, the second lean air-fuel ratio and the second rich air-fuel ratio may be changed on the basis of a value that changes in accordance with the temperature of the first catalyst 53 acquired by first catalyst temperature acquisition means (not shown) for acquiring the temperature of the first catalyst 53 and/or the temperature of the second catalyst 54 acquired by second catalyst temperature acquisition means (not shown) for acquiring the temperature of the second catalyst 54.

Although in the foregoing embodiments, the maximum oxygen storage amounts CSCmax, CUFmax of the first and second catalysts 53, 54 are estimated on the basis of the value of the output vabyfs of the upstream-most air-fuel ratio sensor 66, the maximum oxygen storage amounts CSCmax, CUFmax may be estimated on the basis of the value of a known upstream-of-first catalyst air-fuel ratio that is constant during each mode if an abnormality of the upstream-most air-fuel ratio sensor 66 has been detected. Specifically, for example, during the third mode (time t3 to t4) in FIG. 5, the upstream-of-first catalyst air-fuel ratio is the constant first rich air-fuel ratio (stoich/1.02). Therefore, the maximum oxygen storage amount CSCmax3 during the third mode may be determined as in $0.23 \times \text{Imfr3} \times (\text{stoich}-\text{abyfR1}) \times \Delta t3$ based on the aforementioned mathematical expressions 1 and 2, where $\Delta t3$ is the length of time t3 to t4; abyfR1 is the first rich air-fuel ratio; and mfr3 is the amount of fuel supplied per unit time during the third mode.

In the foregoing embodiments, if the catalyst degradation determining condition is fulfilled, the upstream-of-first catalyst air-fuel ratio is set at the first lean air-fuel ratio regardless of the then-occurring output Voxs1 of the downstream-of-first catalyst air-fuel ratio sensor and the then-occurring output Voxs2 of the downstream-of-second catalyst air-fuel ratio sensor. However, in order to lessen emissions, it is preferable that the upstream-of-first catalyst air-fuel ratio initially set for estimation of the oxygen storage amount be variably set in accordance with the output Voxs1 of the downstream-of-first catalyst air-fuel ratio sensor and the output Voxs2 of the downstream-of-second catalyst air-fuel ratio sensor that occur at the time of fulfillment of the catalyst degradation determining condition.

More specifically, if both the downstream-of-first catalyst air-fuel ratio sensor output Voxs1 and the downstream-of-second catalyst air-fuel ratio sensor output Voxs2 indicate rich air-fuel ratios when the catalyst degradation determining condition is fulfilled, the control of the upstream-of-first catalyst air-fuel ratio is started in the first mode. That is, the upstream-of-first catalyst air-fuel ratio is set at the first lean air-fuel ratio.

If the downstream-of-first catalyst air-fuel ratio sensor output Voxs1 indicates a lean air-fuel ratio and the downstream-of-second catalyst air-fuel ratio sensor output Voxs2 indicates a rich air-fuel ratio at the time of fulfillment of the catalyst degradation determining condition, the control is started in the second mode in which the upstream-of-first catalyst air-fuel ratio is set at the second lean air-fuel ratio.

If both the downstream-of-first catalyst air-fuel ratio sensor output Voxs1 and the downstream-of-second catalyst air-fuel ratio sensor output Voxs2 indicate lean air-fuel ratios at the time of fulfillment of the catalyst degradation determining condition, the control is started in the third mode in which the upstream-of-first catalyst air-fuel ratio is set at the first rich air-fuel ratio. In this case, the maximum oxygen storage amounts estimated during the initial third mode and the subsequent fourth mode are not accurate, and therefore should preferably not be used for determination regarding catalyst degradation. In a preferable method, the sequence of the third mode and the fourth mode is performed again after the end of the sixth mode in order to measure the maximum oxygen storage amounts in the third and fourth modes, and the thus-measured maximum oxygen storage amounts are used for determination regarding catalyst degradation. In this case, the maximum oxygen storage amount of the first catalyst 53 acquired in the initial fifth mode corresponds to a first catalyst's first maximum oxygen storage amount; the maximum oxygen storage amount of the second catalyst 54 acquired in the following fifth mode corresponds to a second catalyst's first maximum oxygen storage amount; the maximum oxygen storage amount of the first catalyst 53 acquired in the following third mode corresponds to a first catalyst's second maximum oxygen storage amount; and the maximum oxygen storage amount of the second catalyst 54 acquired in the following fourth mode corresponds to a second catalyst's second maximum oxygen storage amount.

Then, it may be determined whether the first catalyst 53 has degraded on the basis of the first catalyst's first maximum oxygen storage amount and the first catalyst's second maximum oxygen storage amount (e.g., on the basis of a mean value of the two amounts), and it may be determined whether the second catalyst 54 has degraded on the basis of the second catalyst's first maximum oxygen storage amount and the second catalyst's second maximum oxygen storage amount (e.g., on the basis of a mean value of the two amounts). It is also possible to determine whether a catalyst device of the first catalyst 53 and the second catalyst 54 combined has degraded on the basis of the aforementioned four maximum oxygen storage amounts (e.g., on the basis of a mean value thereof).

If the downstream-of-first catalyst air-fuel ratio sensor output Voxs1 indicates a rich air-fuel ratio and the downstream-of-second catalyst air-fuel ratio sensor output Voxs2 indicates a lean air-fuel ratio at the time of fulfillment of the catalyst degradation determining condition, the control is started in the fourth mode in which the upstream-of-first catalyst air-fuel ratio is set at the second rich air-fuel ratio.

In this case, the oxygen storage amounts estimated in the initial fourth mode are not accurate. Therefore, a construction is provided for avoiding the use of these oxygen storage amounts for determination regarding catalyst degradation. It is preferable to provide a construction in which the third and fourth modes are performed after execution of the fifth and sixth modes, and these maximum oxygen storage amounts estimated in the third and fourth modes are used for determination regarding catalyst degradation. In this case (where the downstream-of-first catalyst air-fuel ratio sensor output Voxs1 indicates a rich air-fuel ratio and the downstream-of-second catalyst air-fuel ratio sensor output Voxs2 indicates a lean air-fuel ratio at the time of fulfillment of the catalyst degradation determining condition), it is also possible to adopt a construction in which the control is started with the first rich air-fuel ratio, and the fifth, sixth, third and fourth modes are sequentially performed to determine maximum oxygen storage amounts, starting at the time point of a switch of the downstream-of-second catalyst air-fuel ratio sensor output Voxs2 from a lean air-fuel ratio-indicating value to a rich air-fuel ratio-indicating value.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A catalyst degradation determining method for use with an emission control apparatus of an internal combustion engine that includes: a catalyst disposed in an exhaust passage of the internal combustion engine, and a downstream-of-catalyst air-fuel ratio sensor disposed in the exhaust passage downstream of the catalyst, the method comprising the steps of:

acquiring an oxidizing-reducing capability index value that changes in accordance with a degree of an oxidizing-reducing capability of the catalyst;

controlling an upstream-of-catalyst air-fuel ratio occurring upstream of the catalyst to a rich air-fuel ratio that is rich of a stoichiometric air-fuel ratio so that the catalyst completely releases oxygen stored in the catalyst, wherein the rich air-fuel ratio changes from an initial rich air-fuel ratio to a second rich air-fuel ratio that is less rich than the initial rich air-fuel ratio and is equal to or larger than a lower limit value of a window range for the air-fuel ratio;

then controlling the upstream-of-catalyst air-fuel ratio to a lean air-fuel ratio that is lean of the stoichiometric air-fuel ratio and that has a value that is determined in accordance with the oxidizing-reducing capability index value, until a time point when an output of the downstream-of-catalyst air-fuel ratio sensor indicates an air-fuel ratio that is lean of the stoichiometric air-fuel ratio, wherein the lean air-fuel ratio changes from an initial lean air-fuel ratio to a second lean air-fuel ratio that is less lean than the initial lean air-fuel ratio and is equal to or smaller than an upper limit value of the window range;

estimating a maximum oxygen storage amount of the catalyst by taking into account the value of the lean air-fuel ratio to which the upstream-of-catalyst air-fuel ratio was controlled; and determining whether the catalyst has degraded based on the estimated maximum oxygen storage amount of the catalyst.

2. The catalyst degradation determining method according to claim 1, wherein:

the emission control apparatus of the internal combustion engine with which the catalyst degradation determining method is used includes an upstream-of-catalyst air-fuel ratio sensor disposed in the exhaust passage upstream of the catalyst, and an upstream-of-catalyst air-fuel ratio sensor abnormality detector that detects an abnormality of the upstream-of-catalyst air-fuel ratio sensor, the maximum oxygen storage amount of the catalyst is estimated based on an output of the upstream-of-catalyst air-fuel ratio sensor, a determination that the catalyst has degraded is prohibited in a case where the catalyst is in a state in which it is to be determined that the catalyst has degraded based on the estimated maximum oxygen storage amount, and where an abnormality of the upstream-of-catalyst air-fuel ratio sensor has been detected, and it is determined that the catalyst has not degraded regardless of whether an abnormality of the upstream-of-catalyst air-fuel ratio sensor has been detected, in a case where the catalyst is in a state in which it is determined that the catalyst has not degraded based on the estimated maximum oxygen storage amount.

3. A catalyst degradation determining method for use with an emission control apparatus of an internal combustion engine that includes: a catalyst disposed in an exhaust passage of the internal combustion engine, and a downstream-of-catalyst air-fuel ratio sensor disposed in the exhaust passage downstream of the catalyst. the method comprising the steps of:

acquiring an oxidizing-reducing capability index value that changes in accordance with a degree of an oxidizing-reducing capability of the catalyst;

controlling an upstream-of-catalyst air-fuel ratio occurring upstream of the catalyst to a rich air-fuel ratio that is rich of a stoichiometric air-fuel ratio so that the catalyst completely releases oxygen stored in the catalyst, the rich air-fuel ratio is equal to or larger than a lower limit value of a window range for the air-fuel ratio;

then controlling the upstream-of-catalyst air-fuel ratio to a lean air-fuel ratio that is lean of the stoichiometric air-fuel ratio and that has a value that is determined in accordance with the oxidizing-reducing capability index value, until a time point when an output of the downstream-of-catalyst air-fuel ratio sensor indicates an air-fuel ratio that is lean of the stoichiometric air-fuel ratio, wherein the lean air-fuel ratio is equal to or smaller than an upper limit value of the window range;

estimating a maximum oxygen storage amount of the catalyst by taking into account the value of the lean air-fuel ratio to which the upstream-of-catalyst air-fuel ratio was controlled; and determining whether the catalyst has degraded based on the estimated maximum oxygen storage amount of the catalyst, wherein, as the estimated maximum oxygen storage amount of the catalyst decreases, the lower limit value of the window range increases and the upper limit value of the window range decreases.

* * * * *

UNITED STATES PATENT AND TRADEMARK OFFICE
CERTIFICATE OF CORRECTION

PATENT NO. : 7,165,389 B2  
APPLICATION NO. : 11/133208  
DATED : January 23, 2007  
INVENTOR(S) : Akira Kamoto et al.

Page 1 of 1

It is certified that error appears in the above-identified patent and that said Letters Patent is hereby corrected as shown below:

Title Page, item (75)  
Please delete the following:

(75) Inventors: Akira KAMOTO, Susono (JP); Toshinari NAGAI, Sunto-gun (JP); Yosuhiro OI, Numazu (JP); Noriyasu ADACHI, Susomo (JP); Koji IDE, Toyota (JP); Daisuke KOBAYASHI, Susono (JP); Shuntaro OKAZAKI, Susono (JP); Naoto KATO, Susono (JP); Takahiro UCHIDA, Susono (JP)

and Replace with:

(75) Inventors: Akira KAMOTO, Susono (JP); Toshinari NAGAI, Sunto-gun (JP); Yasuhiro OI, Numazu (JP); Noriyasu ADACHI, Susomo (JP); Koji IDE, Toyota (JP); Daisuke KOBAYASHI, Susono (JP); Shuntaro OKAZAKI, Susono (JP); Naoto KATO, Susono (JP); Takahiro UCHIDA, Susono (JP)

Signed and Sealed this

Thirty-first Day of July, 2007

JON W. DUDAS  
*Director of the United States Patent and Trademark Office*